United States Patent
Lee et al.

(10) Patent No.: US 9,532,338 B2
(45) Date of Patent: Dec. 27, 2016

(54) METHOD FOR TRANSMITTING CONTROL INFORMATION IN WIRELESS COMMUNICATION SYSTEM AND APPARATUS THEREFOR

(71) Applicant: LG ELECTRONICS INC., Seoul (KR)

(72) Inventors: Seungmin Lee, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 34 days.

(21) Appl. No.: 14/414,380

(22) PCT Filed: Jul. 24, 2013

(86) PCT No.: PCT/KR2013/006622
§ 371 (c)(1),
(2) Date: Jan. 12, 2015

(87) PCT Pub. No.: WO2014/017822
PCT Pub. Date: Jan. 30, 2014

(65) Prior Publication Data
US 2015/0189640 A1    Jul. 2, 2015

Related U.S. Application Data

(60) Provisional application No. 61/675,321, filed on Jul. 24, 2012.

(51) Int. Cl.
H04L 5/00 (2006.01)
H04W 72/04 (2009.01)
(Continued)

(52) U.S. Cl.
CPC ........... *H04W 72/0406* (2013.01); *H04B 7/26* (2013.01); *H04L 5/0053* (2013.01); *H04L 5/0035* (2013.01);
(Continued)

(58) Field of Classification Search
CPC ........ H04B 7/26; H04L 5/0035; H04L 5/0037; H04L 5/0048; H04L 5/0053; H04L 5/1469; H04W 72/0406; H04W 72/042
(Continued)

(56) References Cited

U.S. PATENT DOCUMENTS

2010/0067441 A1    3/2010  Kim et al.
2010/0238821 A1    9/2010  Liu et al.
(Continued)

FOREIGN PATENT DOCUMENTS

KR    10-2008-0111393 A    12/2008
KR    10-2010-0034691 A    4/2010
(Continued)

*Primary Examiner* — Andrew Lai
*Assistant Examiner* — M Mostazir Rahman
(74) *Attorney, Agent, or Firm* — Birch, Stewart, Kolasch & Birch, LLP

(57) ABSTRACT

The present invention relates to a method for enabling user equipment to receive control information in a wireless communication system, comprising the steps of: receiving, from a first base station, first control information in which the control information is allocated on a specific wireless resource area according to a first pattern; and receiving from a second base station, second control information in which the control information is assigned on the specific wireless resource area according to a second pattern, wherein the first pattern is determined on the basis of identification information associated with the first base station, the second pattern is determined on the basis of identification information
(Continued)

associated with the second base station, and the first and second patterns are set so as not to overlap each other.

10 Claims, 24 Drawing Sheets

(51) Int. Cl.
  *H04B 7/26* (2006.01)
  *H04L 5/14* (2006.01)
(52) U.S. Cl.
  CPC .......... *H04L 5/0037* (2013.01); *H04L 5/0048* (2013.01); *H04L 5/1469* (2013.01); *H04W 72/042* (2013.01)
(58) Field of Classification Search
  USPC .......................................................... 370/329
  See application file for complete search history.

(56) References Cited

U.S. PATENT DOCUMENTS

| | | | |
|---|---|---|---|
| 2010/0303034 A1* | 12/2010 | Chen | H04L 5/0023 370/329 |
| 2011/0096745 A1* | 4/2011 | Ahn | H04L 5/0016 370/329 |
| 2011/0250898 A1 | 10/2011 | Mitra et al. | |
| 2012/0177090 A1* | 7/2012 | Iwai | H04B 7/024 375/219 |
| 2013/0182648 A1* | 7/2013 | Abe | H04L 5/0048 370/328 |

FOREIGN PATENT DOCUMENTS

| | | |
|---|---|---|
| KR | 10/2011-0132595 A | 12/2011 |
| WO | WO 2008/056254 A1 | 12/2008 |
| WO | WO 2011/002263 A2 | 1/2011 |

\* cited by examiner

FIG. 2
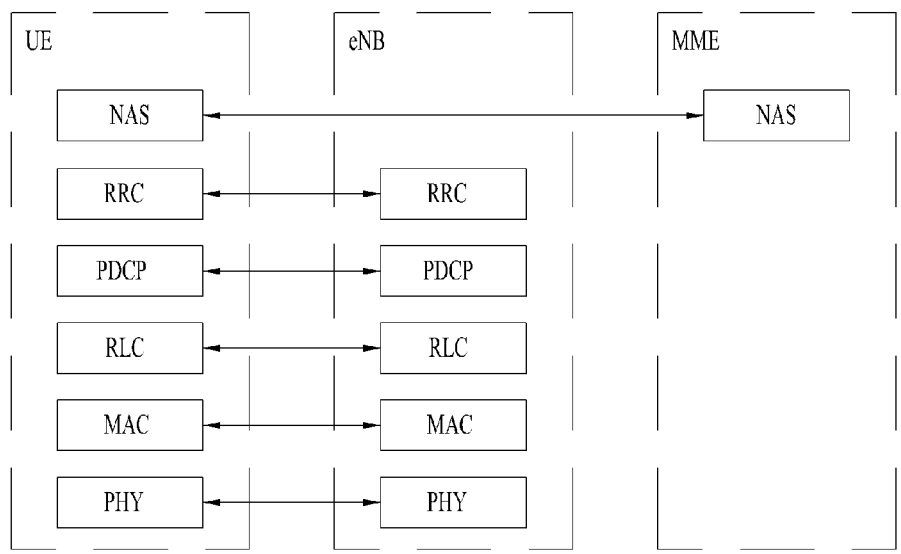
(a) CONTROL-PLANE PROTOCOL STACK
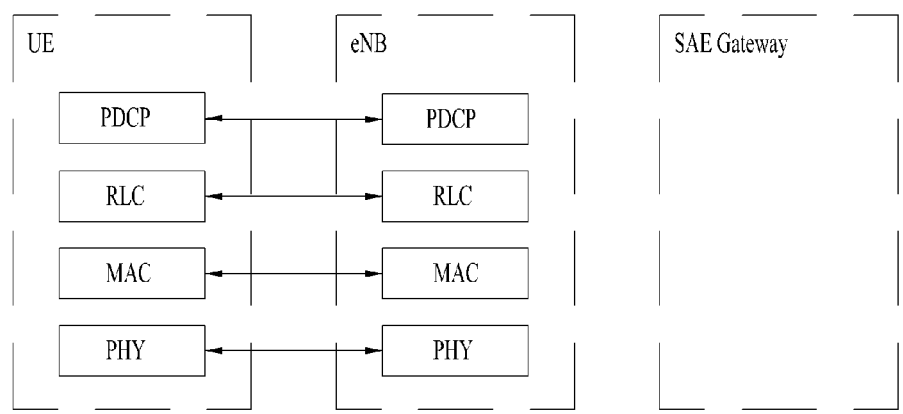
(b) USER-PLANE PROTOCOL STACK FIG. 8
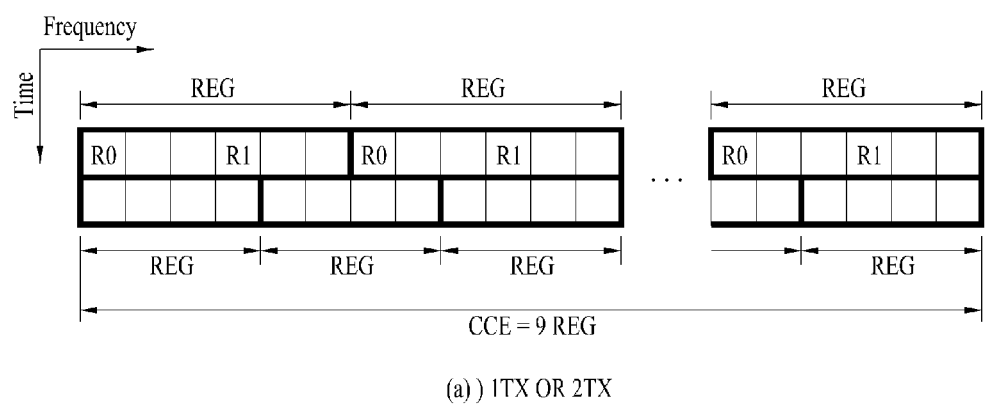
(a) ) 1TX OR 2TX
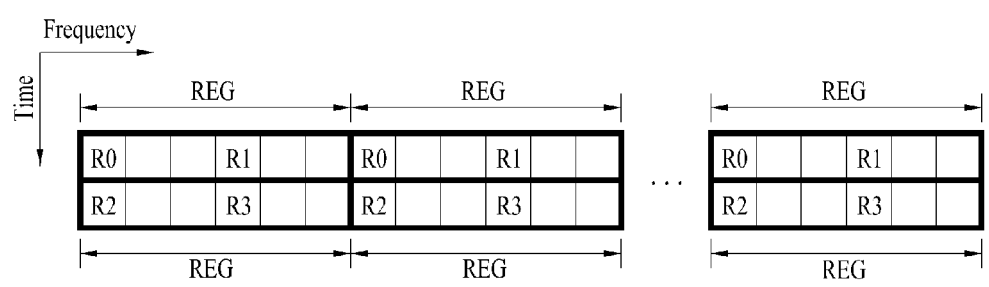
(b) 4 TX

FIG. 14a
(A) CASE OF CELL #X (I.E. EXAMPLE OF PRB PAIR #(N+4)) CELL #X
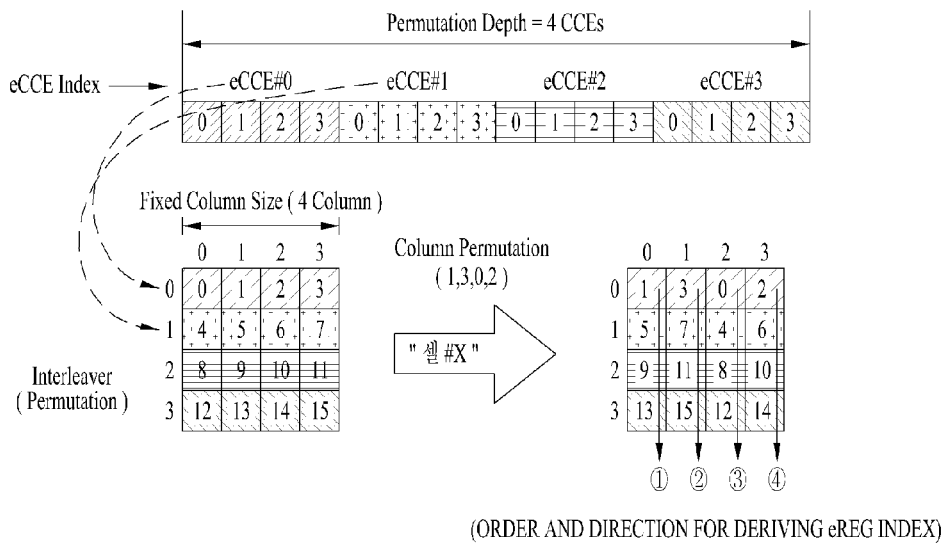
(ORDER AND DIRECTION FOR DERIVING eREG INDEX)
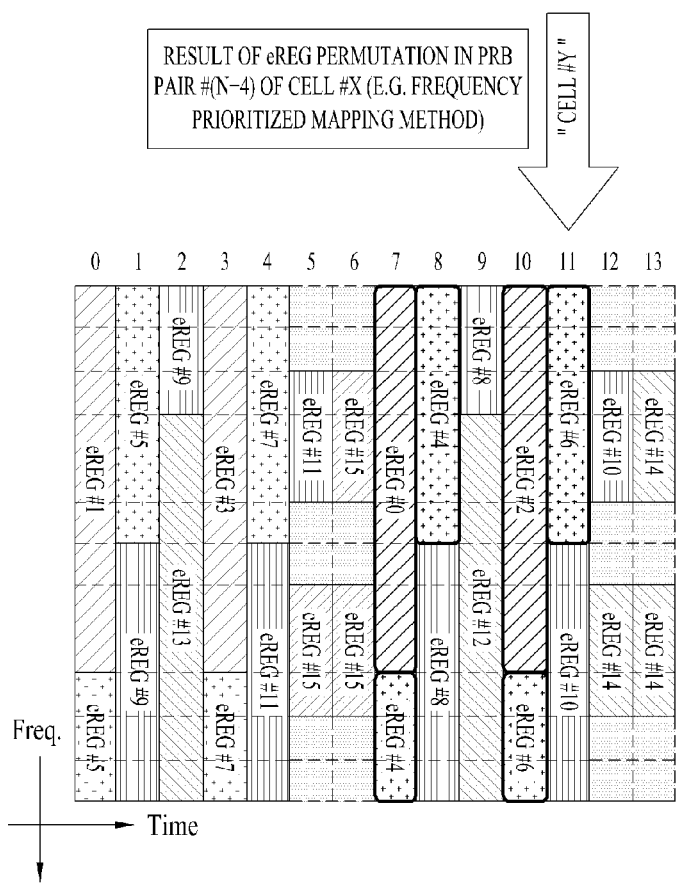

FIG. 15a
(A) CASE OF CELL #X (I.E. EXAMPLE OF PRB PAIR #(N+4))
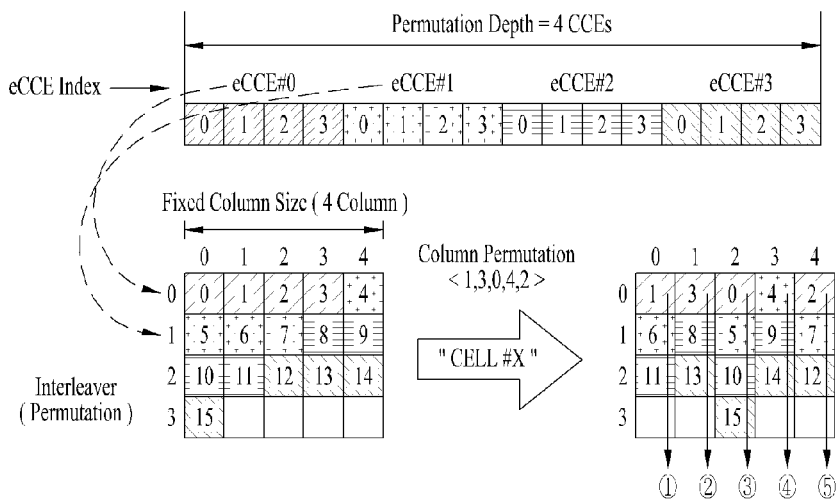
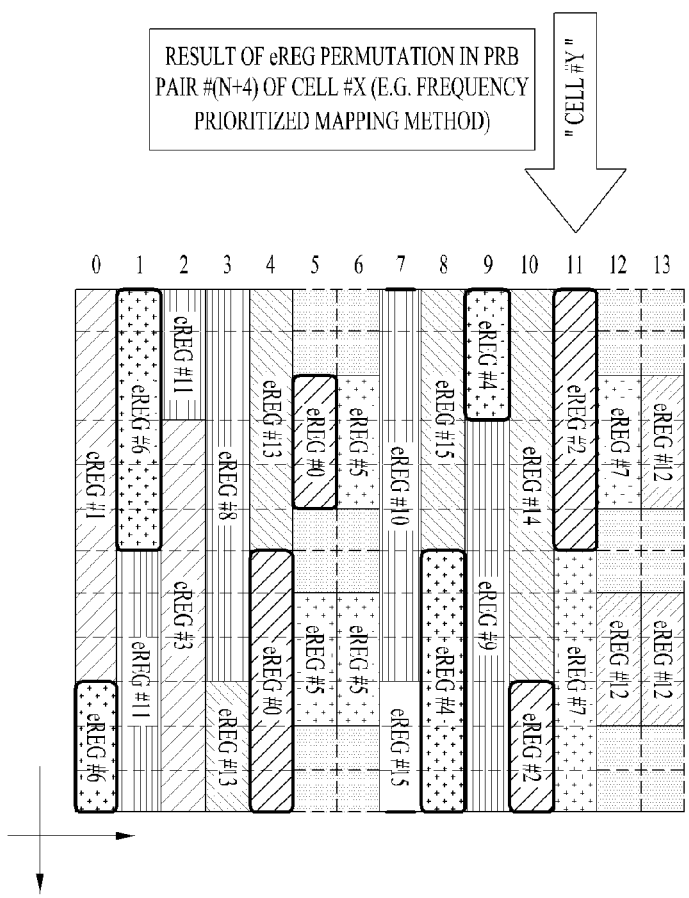

FIG. 15b
(B) CASE OF CELL #Y (I.E. EXAMPLE OF PRB PAIR #(N+4))
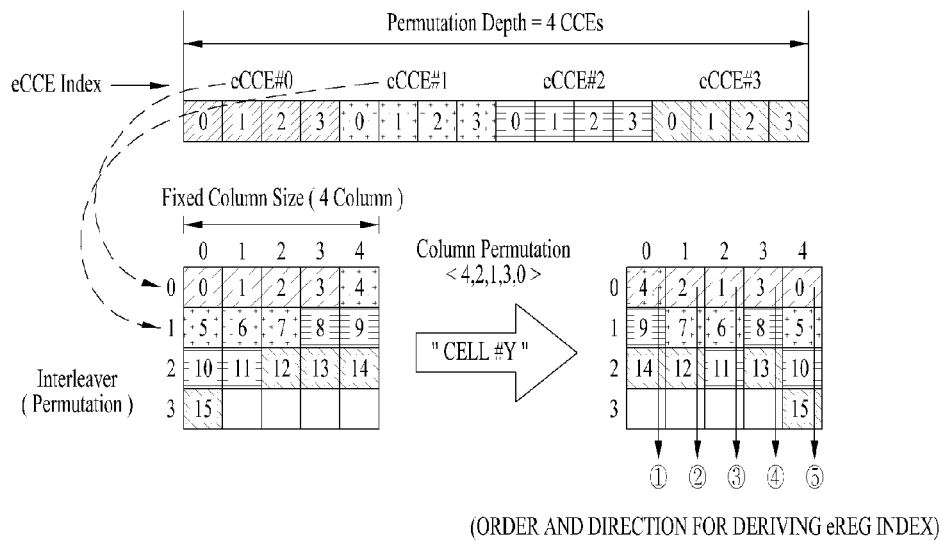
(ORDER AND DIRECTION FOR DERIVING eREG INDEX)
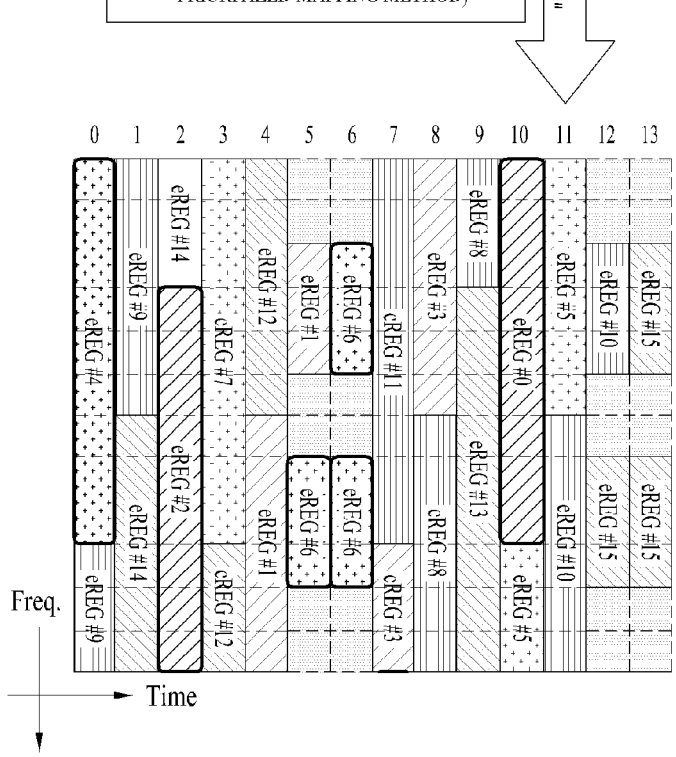

FIG. 16a
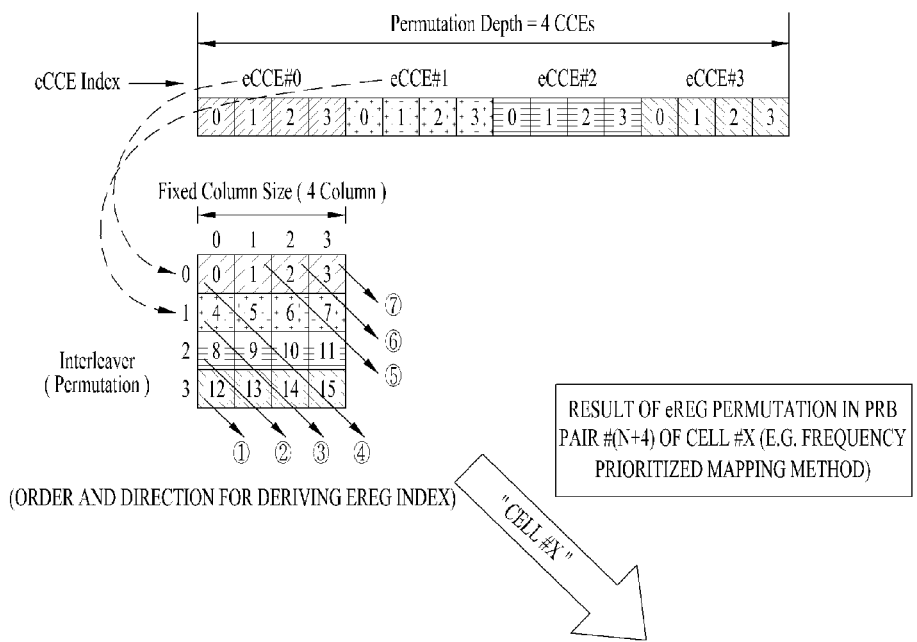
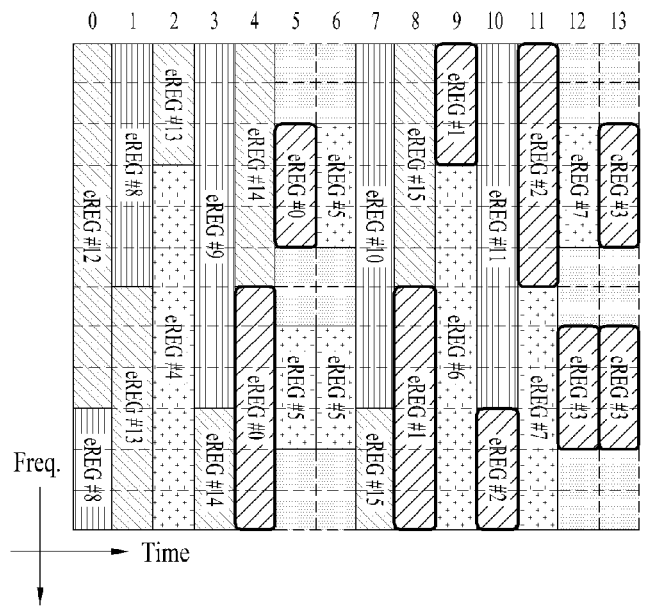

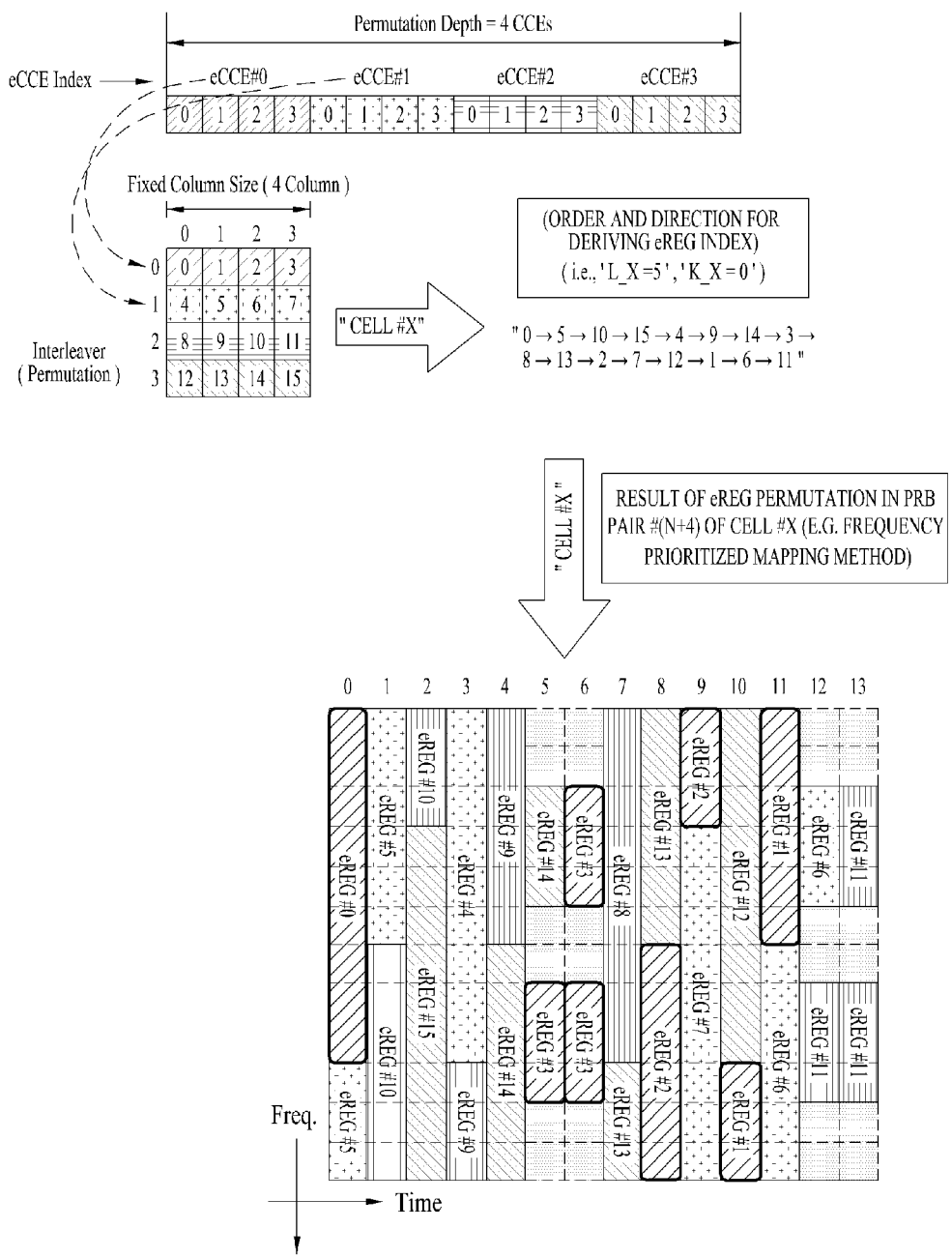

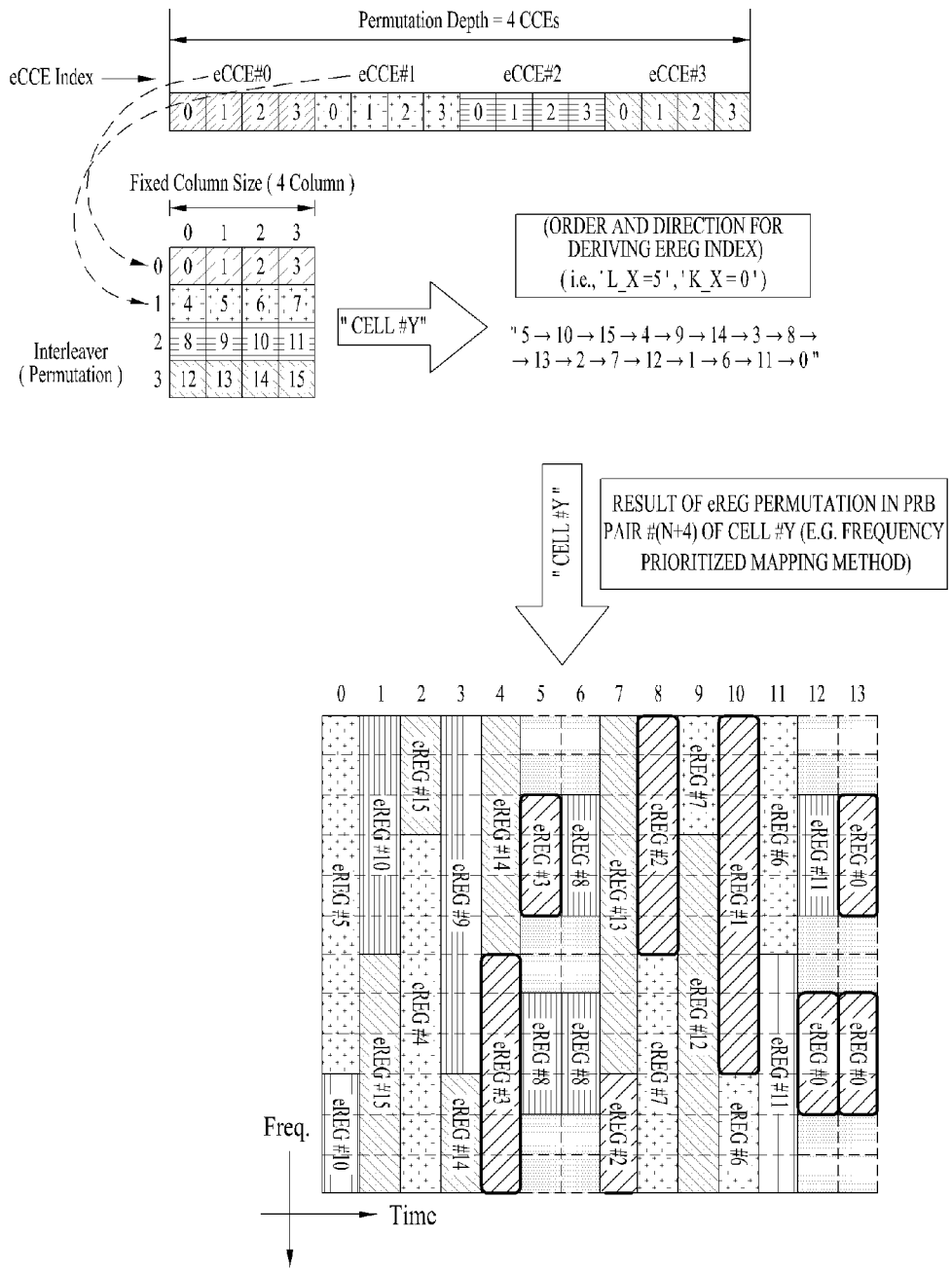

METHOD FOR TRANSMITTING CONTROL INFORMATION IN WIRELESS COMMUNICATION SYSTEM AND APPARATUS THEREFOR

CROSS REFERENCE TO RELATED APPLICATIONS

This application is the National Phase of PCT/KR2013/006622 filed on Jul. 24, 2013, which claims priority under 35 U.S.C. 119(e) to U.S. Provisional Application No. 61/675,321 filed on Jul. 24, 2012, all of which are hereby expressly incorporated by reference into the present application.

TECHNICAL FIELD

The present invention relates to a wireless communication system, and more particularly, to a method and apparatus for transmitting control information in a wireless communication system.

BACKGROUND

As an example of a mobile communication system to which the present invention is applicable, a 3rd generation partnership project long term evolution (3GPP LTE) (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information. In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

DISCLOSURE

Technical Problem

An object of the present invention devised to solve the problem lies in a method and apparatus for transmitting control information in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for receiving control information by a user equipment (UE) in a wireless communication system, the method including receiving first control information obtained by allocating the control information onto a specific radio resource region according to a first pattern, from a first base station (BS) and receiving second control information obtained by allocating the control information onto the specific radio resource region according to a second pattern, from a second BS, wherein the first pattern may be determined based on identity information associated with the first BS, and the second pattern may be determined based on identity information associated with the second BS, and the first pattern and the second pattern may be configured so as not to overlap each other.

The identity information may be information associated with at least one of a physical cell ID, a virtual cell ID, a random seed value for generation of a sequence of a specific reference signal, a scrambling ID of DM-RS, and an antenna port of DM-RS.

Each of the first pattern and the second pattern may be derived according to identify information associated with each BS from a pre-defined block interleaver. The pre-defined block interleaver may have a column size determined based on a number of a plurality of control information units included in the control information, or the pre-defined block interleaver may have a column size determined to be relatively prime to a number of a plurality of control information units included in the control information. Each of the first pattern and the second pattern may be generated via column permutation of the pre-defined block interleaver or generated in such a way that diagonal matrix values of a matrix included in the pre-defined block interleaver are different.

Each of the first pattern and the second pattern may be derived according to at least one pre-defined parameter from the pre-defined block interleaver. The at least one pre-defined parameter may include at least one of a specific radio resource unit index associated with the pre-defined block interleaver, and increasing offset for a radio resource unit index, may be received via higher layer signaling, may be configured to be shared between the first BS and the second BS, or may be selected from a pre-stored table.

Each of the first pattern and the second pattern may be derived according to a plurality of pre-defined parameters, from a virtual matrix, the at least one pre-defined parameter may include a specific radio resource unit index associated with the virtual index and increasing offset for a radio resource unit index, or the at least one pre-defined parameter may be selected from a pre-stored table.

Advantageous Effects

According to an embodiment of the present invention, control information can be effectively transmitted in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating structures of a control plane and a user plane of a radio interface protocol between a UE and an E-UTRAN based on 3GPP radio access network specifications;

FIG. 8 is a diagram illustrating resource units used to configure a control channel;

FIGS. 15 to 18 are diagrams illustrating cases in which block interleaver or permutation is performed according to embodiments of the present invention.

BEST MODE

Figure 1:
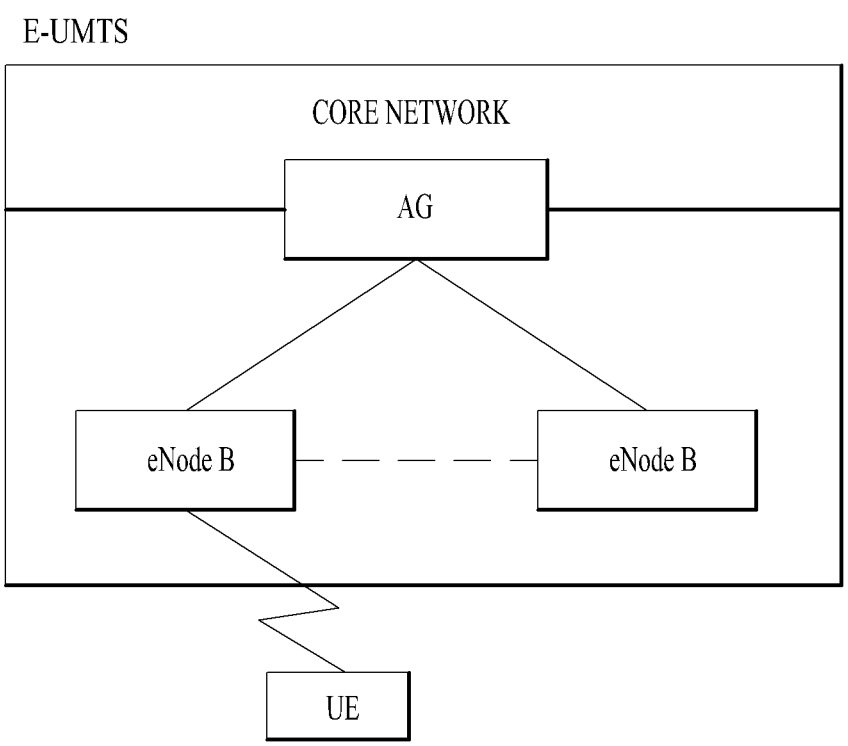
FIG. 1 is a diagram schematically illustrating a network structure of an E-UMTS as an exemplary radio communication system.

The following technology may be applied to a variety of wireless access systems using code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3GPP LTE is a part of evolved UMTS (E-UMTS) using E-UTRA. 3GPP LTE employs OFDMA in DL and SC-FDMA in UL. LTE-advanced (LTE-A) is an evolved version of 3GPP LTE.

For clarity of description, the following description focuses on the 3GPP LTE/LTE-A system. However, the technical features of the present invention are not limited thereto. Specific terms used in the following description are provided to aid in understanding the present invention. These specific terms may be replaced with other terms within the scope and spirit of the present invention.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer, which is a first layer, provides an information transfer service to an upper layer using a physical channel. The physical layer is connected to a media access control (MAC) layer of an upper layer via a transmission channel (an antenna port channel). Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an OFDMA scheme in DL and is modulated using an SC-FDMA scheme in UL.

The MAC layer, which is a second layer, provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is configured to use one of bandwidths of 1.4, 3, 5, 10, and 20 MHz to provide a DL or UL transmission service to a plurality of UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
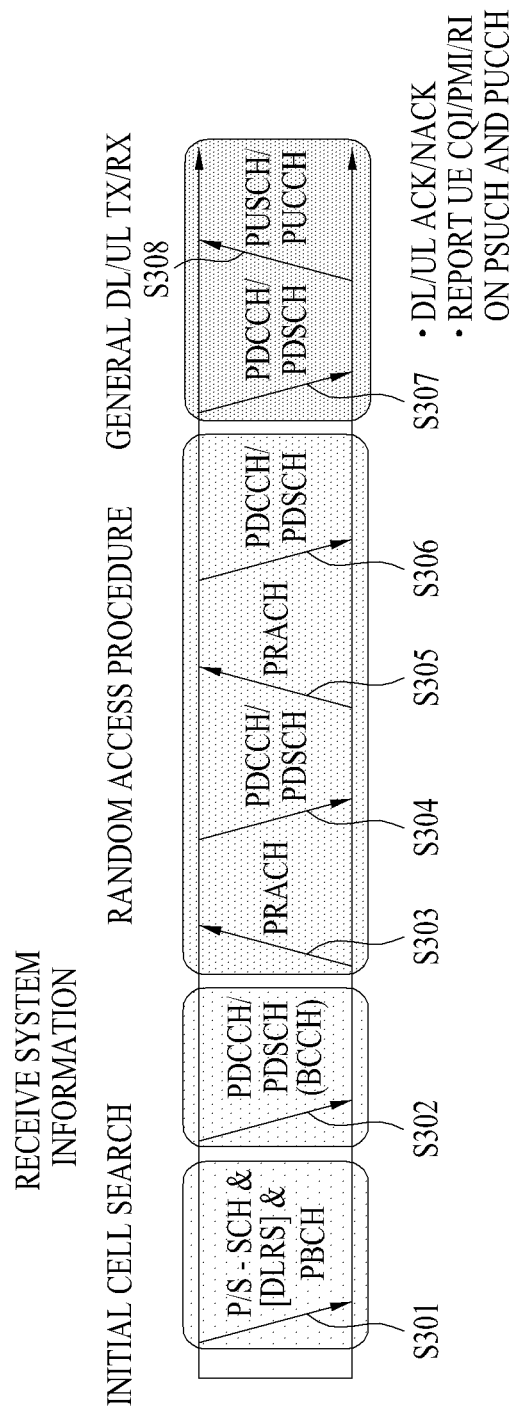
FIG. 3 is a diagram illustrating physical channels used in a 3GPP system and a general signal transmission method using the same.

FIG. 3 is a diagram illustrating physical channels used in a 3GPP system and a general signal transmission method using the same.

When a UE is powered on or enters a new cell, the UE performs initial cell search such as synchronization acquisition with an eNB in step S301. To this end, the UE may receive a primary synchronization channel (P-SCH) and a secondary synchronization channel (S-SCH) from the eNB, establish synchronization with the eNB, and acquire information such as a cell identity (ID). Thereafter, the UE may receive a physical broadcast channel (PBCH) from the eNB to acquire information broadcast in the cell. Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S302.

Next, the UE may perform a random access procedure such as steps S303 to S306 to complete access to the eNB. To this end, the UE may transmit a preamble through a physical random access channel (PRACH) (S303) and receive a response message to the preamble through the PDCCH and the PDSCH corresponding to the PDCCH (S304). In the case of contention-based random access, a contention resolution procedure including transmission of a PRACH signal (S305) and reception of a PDCCH signal and a PDSCH signal corresponding to the PDCCH signal (S306) may be additionally performed.

The UE which has performed the above procedures may receive a PDCCH and/or PDSCH signal (step S307) and transmit a physical uplink shared channel (PUSCH) and/or physical uplink control channel (PUCCH) signal (step S308) according to a general UL/DL signal transmission procedure. Control information that the UE transmits to the eNB is referred to as uplink control information (UCI). The UCI includes a hybrid automatic repeat and request (HARQ) acknowledgement (ACK)/negative ACK (NACK), a scheduling request (SR), channel state information (CSI), etc. In the present disclosure, HARQ ACK/NACK is shortened to HARQ-ACK or ACK/NACK (A/N). HARQ-ACK includes at least one of positive ACK (simply, ACK), negative ACK (simply, NACK), discontinuous transmission (DTX), and NACK/DTX. The CSI includes a channel quality indicator (CQI), a precoding matrix index (PMI), a rank indicator (RI), etc. While UCI is generally transmitted on a PUCCH, if control information and traffic data are to be transmitted simultaneously, the UCI may be transmitted on a PUSCH. The UCI may be transmitted aperiodically on the PUSCH upon request/command of a network.

Figure 4:
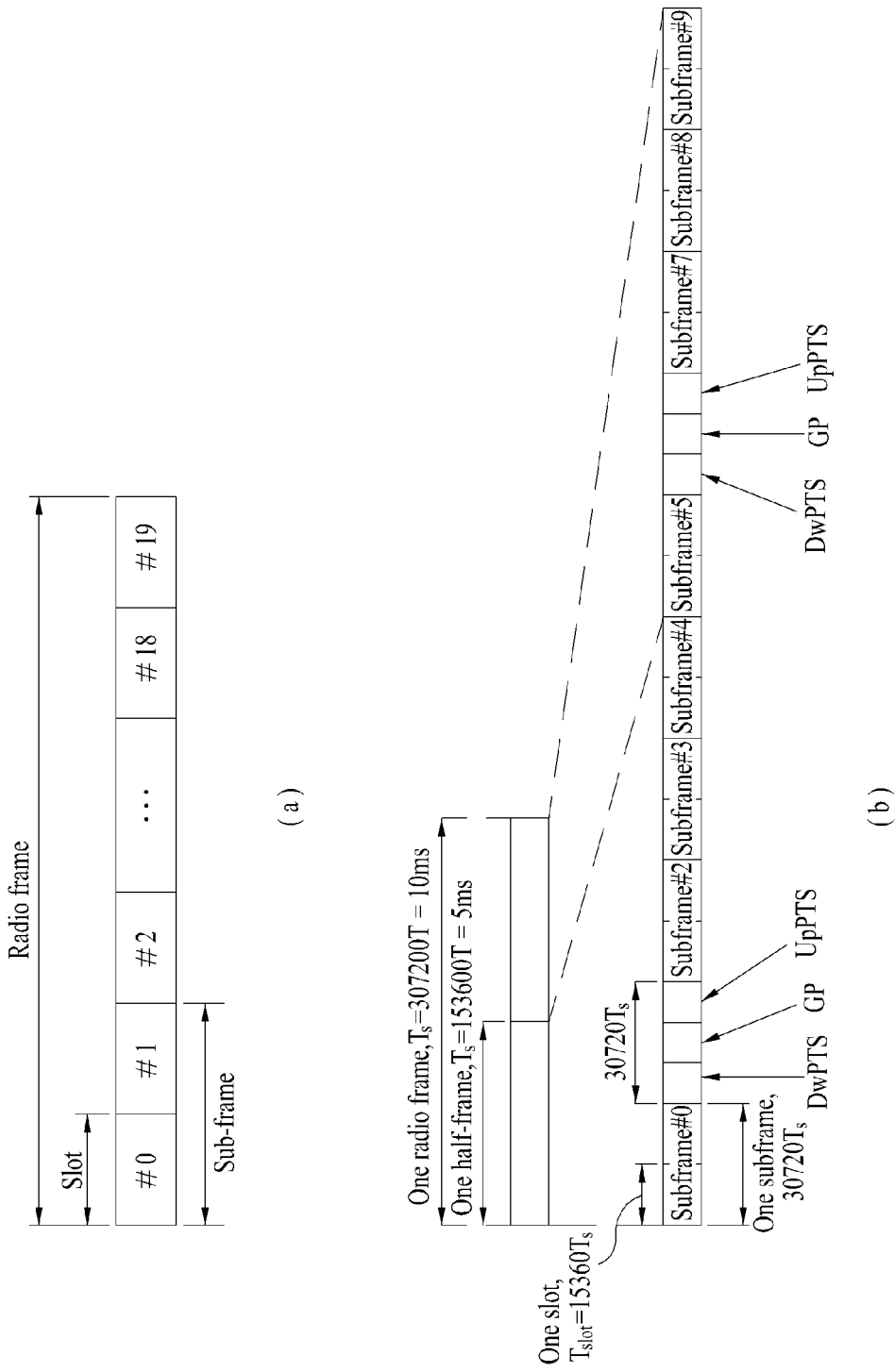
FIG. 4 is a diagram illustrating the structure of a radio frame used in an LTE system.

FIG. 4 is a diagram illustrating the structure of a radio frame used in an LTE system.

Referring to FIG. 4, in a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating the structure of the type 1 radio frame. A DL radio frame includes 10 subframes, each subframe including two slots in the time domain. A time required to transmit one subframe is defined as a Transmission Time Interval (TTI). For example, one subframe may be 1 ms long and one slot may be 0.5 ms long. One slot includes a plurality of OFDM symbols in the time domain and a plurality of resource blocks (RBs) in the frequency domain. Since 3GPP LTE uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when the UE rapidly moves, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

FIG. 4(b) illustrates the structure of the type 2 radio frame. The type 2 radio frame includes two half frames, each half frame including four general subframes each having two slots and one special subframe including a downlink pilot time slot (DwPTS), a guard period (GP), and an uplink pilot time slot (UpPTS).

In the special subframe, the DwPTS is used for initial cell search, synchronization, or channel estimation at a UE, and the UpPTS is used for channel estimation and UL transmission synchronization with a UE at an eNB. That is, the DwPTS is used for DL transmission and the UpPTS is used for UL transmission. Particularly, the UpPTS is used for transmission of a PRACH preamble or a sounding reference signal (SRS). The GP is used to cancel UL interference between UL and DL, caused by multi-path delay of a DL signal.

The current 3GPP standard specification defines the following configurations listed in Table 1 below for the special subframe. Table 1 illustrates DwPTSs and UpPTSs in the case where $T_s=1(15000\times2048)$. The remaining region except for a DwPTS and an UpPTS is set as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2190 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | $12800 \cdot T_S$ | | |
| 8 | $24144 \cdot T_S$ | | | — | — | — |
| 9 | $13168 \cdot T_S$ | | | — | — | — |

Meanwhile, the type 2 radio frame structure, that is, UL/DL subframe configurations in a TDD system are listed in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. Table 2 further illustrates DL-to-UL switch point periodicities for the respective UL/DL subframe configurations in the system.

The above-described structures of radio frames are purely exemplary. Accordingly, the number of subframes in a radio frame, the number of slots in a subframe, and the number of symbols in a slot may be changed in various manners.

Figure 5:
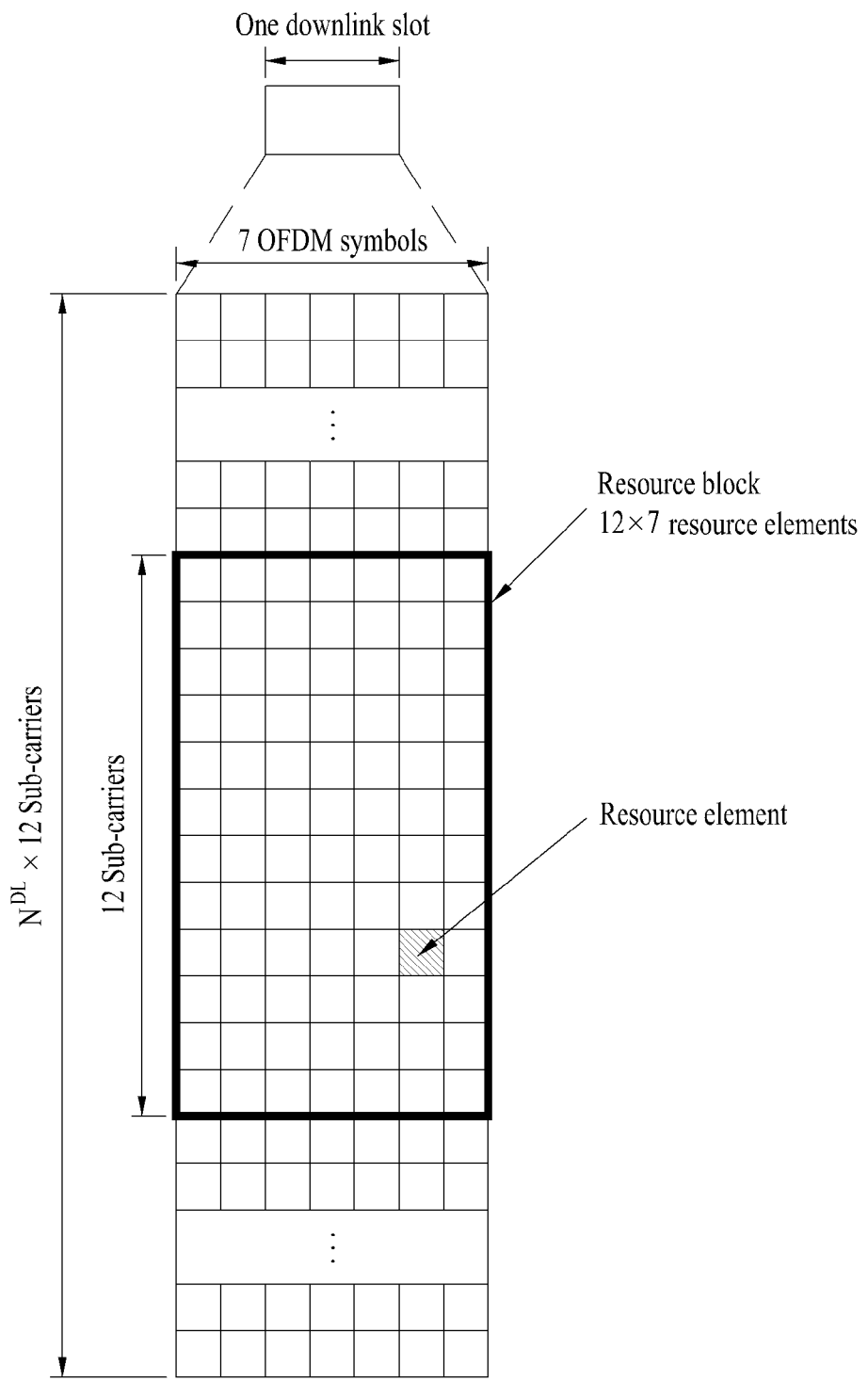
FIG. 5 illustrates a resource grid of a downlink slot.

FIG. 5 illustrates a resource grid of a DL slot.

Referring to FIG. 5, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times N_{sc}^{RB}$ subcarriers in the frequency domain. Although FIG. 5 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE indicated by one OFDM symbol index and one subcarrier index. One RB includes $N_{symb}^{DL} \times N_{sc}^{RB}$. The number of RBs, $N_{RB}^{DL}$ included in a DL slot depends on DL bandwidth configured in a cell.

Figure 6:
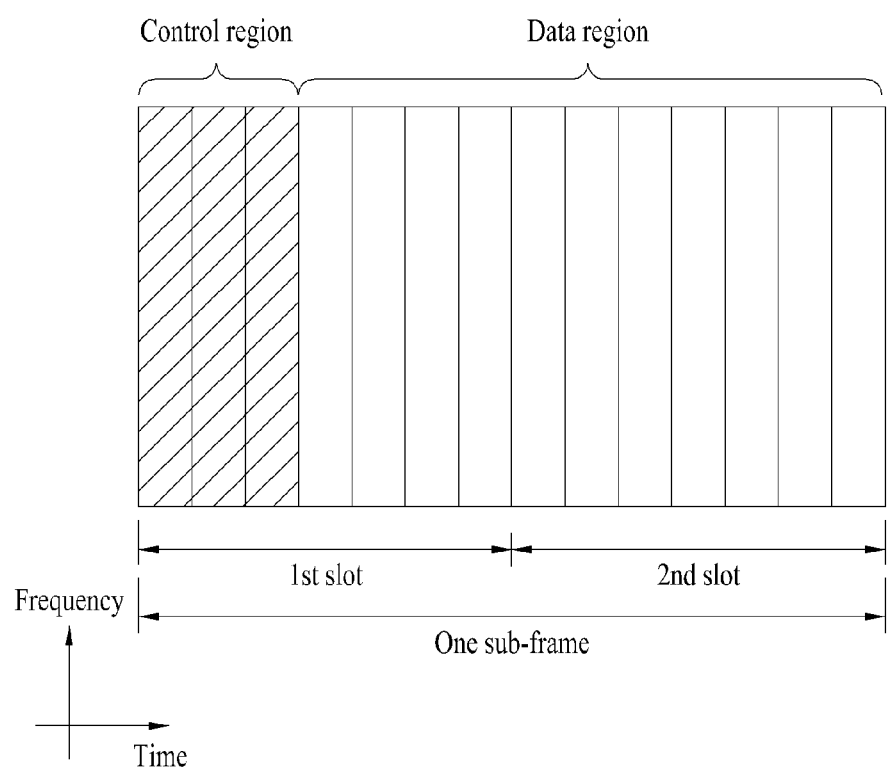
FIG. 6 illustrates the structure of a downlink subframe used in an LTE system.

FIG. 6 illustrates the structure of a DL subframe.

Referring to FIG. 6, up to three or four OFDM symbols at the start of the first slot of a DL subframe are used as a control region to which control channels are allocated and the other OFDM symbols of the DL subframe are used as a data region to which a PDSCH is allocated. DL control channels defined for the LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE includes a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked by an identifier (ID) (e.g. a radio network temporary identifier (RNTI)) according to the owner or use of the PDCCH. If the PDCCH is destined for a specific UE, the CRC may be masked by a cell-RNTI (C-RNTI) of the UE. If the PDCCH carries a paging message, the CRC thereof may be masked by a paging ID (P-RNTI). If the PDCCH carries system information (particularly, a system information block (SIB)), the CRC thereof may be masked by a system information RNTI (SI-RNTI). If the PDCCH is designated as a random access response, the CRC thereof may be masked by a random access-RNTI (RA-RNTI).

Figure 7:
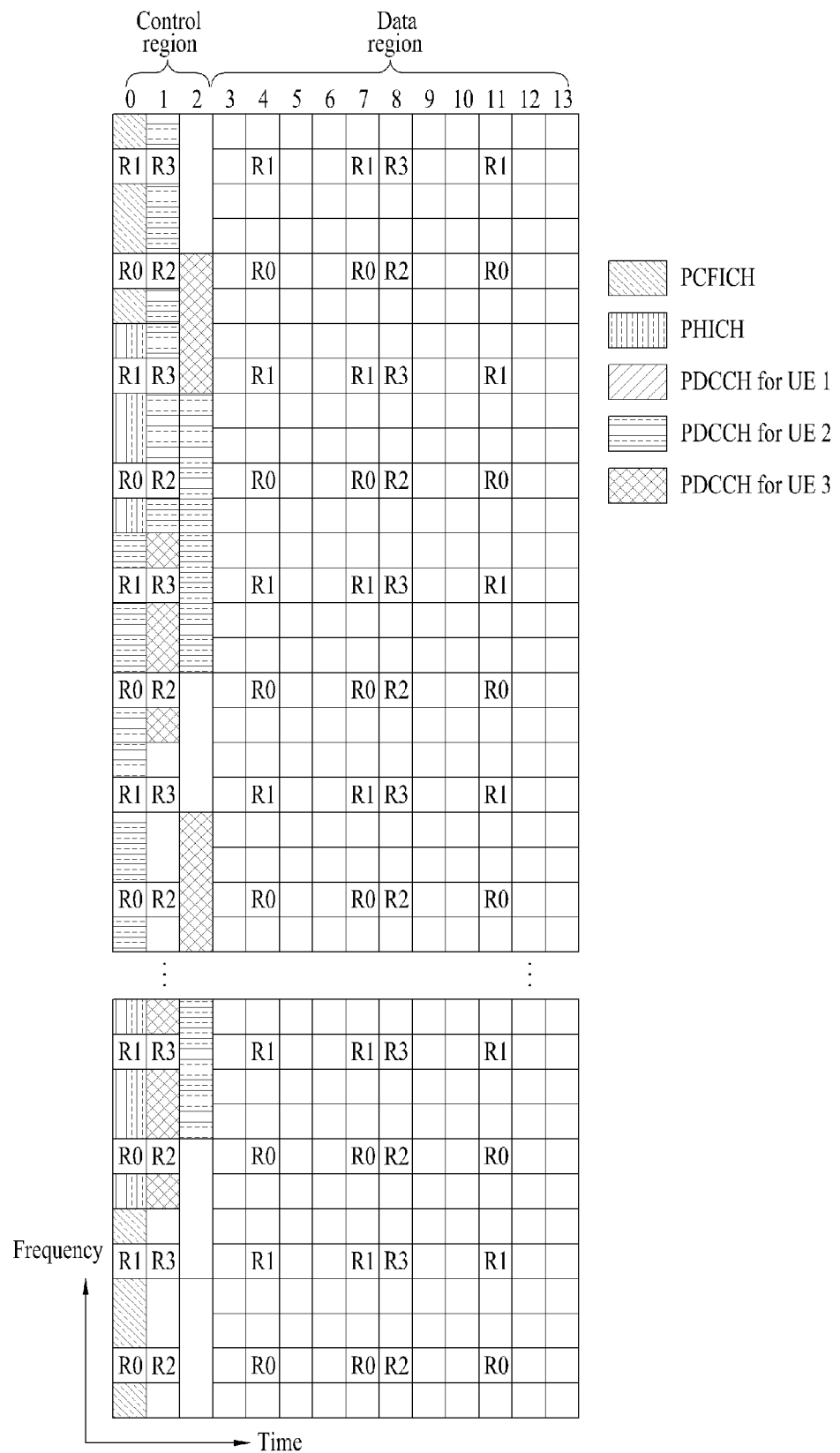
FIG. 7 is a diagram illustrating exemplary control channels included in the control region of a subframe in a downlink radio frame.

FIG. 7 is a diagram illustrating exemplary control channels included in the control region of a subframe in a downlink radio frame.

Referring to FIG. 7, a subframe includes 14 OFDM symbols. A control region occupies the first one to three OFDM symbols and a data region occupies the other 13 to 11 OFDM symbols in the subframe according to the configuration of the subframe. In FIG. 7, reference characters R1 to R4 denote reference signals (RSs) or pilot signals for antennas 0 to 3. RSs are fixed in a predetermined pattern within a subframe irrespective of the control region and the data region. Control channels are allocated to resources unused for RSs in the control region, and traffic channels are allocated to resources unused for RSs in the data region. The control channels allocated to the control region are a physical control format indicator channel (PCFICH), a physical hybrid-arq indicator channel (PHICH), a physical downlink control channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated in quadrature phase shift keying (QPSK), ranges from 1 to 3 or from 2 to 4 according to a bandwidth.

The PHICH is a physical hybrid—automatic repeat and request (HARQ) indicator channel and carries an HARQ ACK/NACK for uplink transmission. That is, the PHICH is a channel used to deliver DL ACK/NACK information for UL HARQ. The PHICH includes one REG and is scrambled cell-specifically. The ACK/NACK is indicated in one bit and modulated in Binary Phase Shift Keying (BPSK). The modulated ACK/NACK is spread with a spreading factor (SF) of 2 or 4. A plurality of PHICHs mapped to the same resources form a PHICH group. The number of PHICHs multiplexed into a PHICH group is determined according to the number of spreading codes. The same PHICH (group) is repeated three times, for achieving a diversity gain in the frequency and/or the time domain.

A PDCCH is allocated to the first n OFDM symbols of a subframe. n is 1 or a larger integer indicated by the PCFICH. The PDCCH includes one or more control channel elements (CCEs). The PDCCH is used to inform a UE or a UE group of the resource allocation of transport channels, namely a PCH and a downlink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, it is assumed that the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe. In this case, UEs within the cell of the eNB monitor the PDCCH using their RNTI information. If one or more UEs have RNTI "A", the UEs receive the PDCCH and receive a PDSCH indicated by "B" and "C" based on the received information of the PDCCH.

FIG. 8 is a diagram illustrating resource units used to configure a control channel. Specifically, FIG. 8(a) illustrates resource units used to configure a control channel, when the number of Transmission (Tx) antennas in an eNB is 1 or 2 and FIG. 8(b) illustrates resource units used to configure a control channel, when the number of Tx antennas in an eNB is 4. Although a different Reference Signal (RS) pattern is used according to the number of Tx antennas, resources unit related to a control channel are configured in the same manner.

FIGS. 8(a) and 8(b), a basic resource unit of a control channel is an REG. An REG includes 4 contiguous Resource Elements (REs) except for REs used for RSs. A bold square represents an REG in FIG. 8. A PCFICH and a PHICH include 4 REGs and 3 REGs, respectively. A PDCCH includes units of control channel elements (CCE), each CCE including 9 REGs.

A UE is configured to check CCEs that are arranged consecutively or according to a specific rule in order to check whether a PDCCH including L CCEs is transmitted to the UE. L may be plural. CCE aggregations that the UE needs to check for PDCCH reception is referred to as a search space.

Search spaces may be classified into a UE-specific search space accessible only to a specific UE and a common search space accessible to all UEs in the cell. A UE monitors common search spaces with CCE aggregation levels 4 and 8 and UE-specific search spaces with CCE aggregation levels 1, 2, 4, and 8. The common search spaces may be overlapped with the UE-specific search spaces.

The position of a first CCE (i.e. a CCE with a lowest index) in a PDCCH search space assigned to a UE, for each CCE aggregation level is changed in every subframe. This is called PDCCH search space hashing.

In a current wireless communication environment, with emergence and dissemination of various devices requiring machine-to-machine (M2M) communication and high data transfer rate, data requirements of a cellular network are growing very quickly. To satisfy high data requirements, carrier aggregation technology for efficiently using a larger frequency band, multi antenna technology for increasing data capacity within a restricted frequency, multi base-station coordinated technology, etc. have been developed as communication technology and a communication environment is evolved to increase the density of nodes which can be accessed by users. Coordination between nodes may improve system performance of a system with such a high density of nodes. In such a system, each node operates as an independent base station (BS), an advanced BS (ABS), a node B (NB), an eNodeB (eNB), an access point (AP), etc. and is far superior performance to a non-coordinated system.

Figure 9:
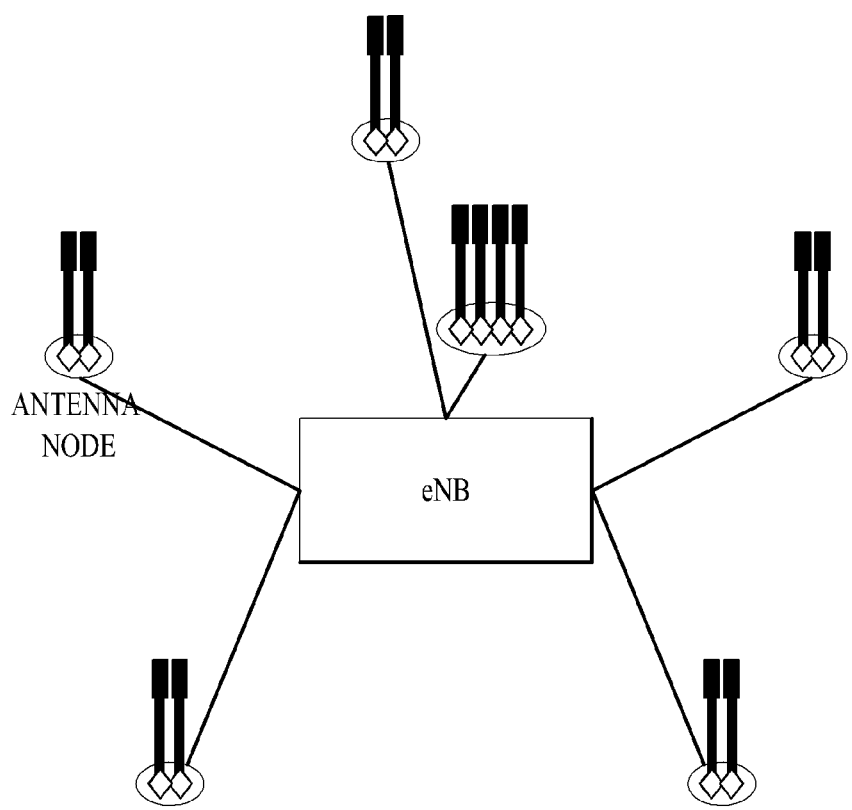
FIG. 9 is a diagram showing a multi-node system in a next-generation communication system.

FIG. 9 is a diagram showing a multi-node system in a next-generation communication system.

Referring to FIG. 9, if transmission and reception of all nodes are managed by one controller such that the individual nodes operate as parts of an antenna group of one cell, this system may be regarded as a distributed multi node system (DMNS) forming one cell. At this time, the individual nodes may be assigned separate node IDs or may operate as some antennas of a cell without a separate node ID. However, a system including nodes having different cell identifiers (IDs) may be a multi cell system. If multiple cells are configured to overlap according to coverage, this is called a multi-tier network.

A NodeB, an eNodeB, a PeNB, a HeNB, a remote radio head (RRH), a relay, a distributed antenna, etc. may become a node and at least one antenna is mounted per node. The node is also called a transmission point. Although the node generally refers to a group of antennas separated at a predetermined interval or more, the present invention is applicable to an arbitrary group of nodes defined regardless of an interval.

Due to introduction of the above-described multi node system and relay node, various communication schemes are applicable to improve channel quality. However, in order to apply the MIMO scheme and an inter-cell communication scheme to a multi node environment, a new control channel is required. Accordingly, an enhanced-physical downlink control channel (E-PDCCH) is being discussed as a newly introduced control channel and is allocated to a data region (hereinafter, referred to as a PDSCH region), not to an existing control region, (hereinafter, referred to as a PDCCH region).

In conclusion, control information of a node can be transmitted to each UE via such an E-PDCCH so as to solve a problem that an existing PDCCH region is insufficient. For reference, the E-PDCCH may not be transmitted to a legacy UE but may only be transmitted to an LTE-A UE.

Hereinafter, cooperative multipoint transmission/reception (CoMP) will be described.

Future systems, after the LTE-A system, will employ a method for enabling cooperation among several cells so as to improve performance. Such a mode is called Cooperative Multipoint Transmission/Reception (CoMP). The CoMP method indicates a method for enabling two or more BSs, access points or cells to cooperate with each other so as to communicate with a UE, in order to more smoothly perform communication between a specific UE and a BS, an access point or a cell. In the present invention, BS, access point and cell have the same meaning.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

Figure 10:
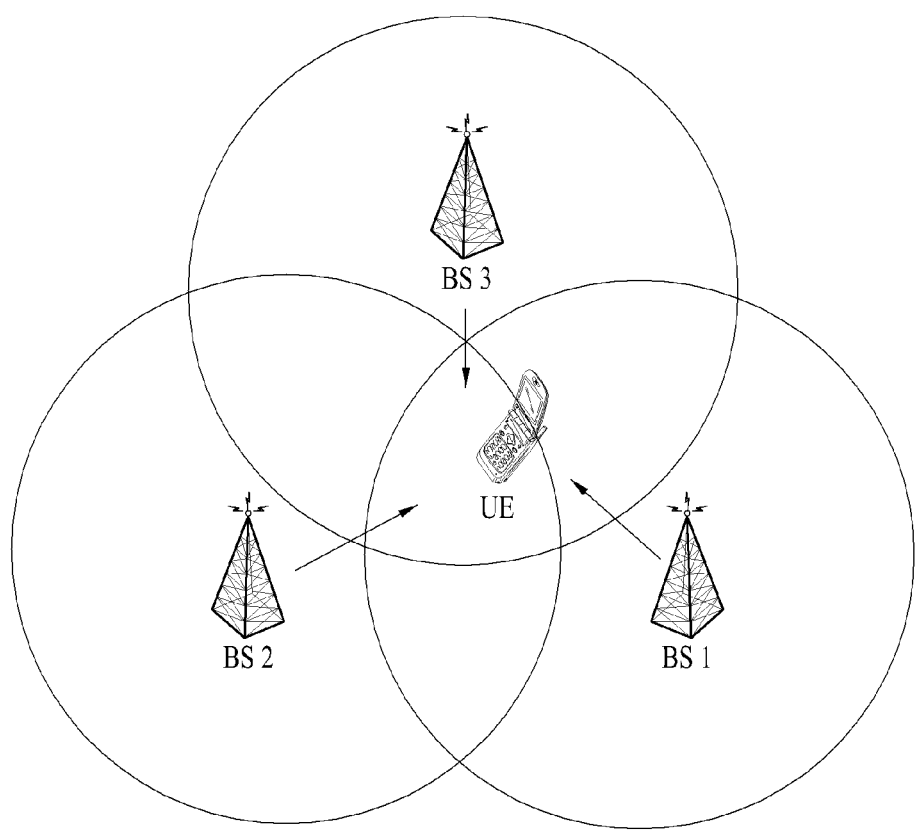
FIG. 10 is a diagram showing an example of performing CoMP.

FIG. 10 is a diagram showing an example of performing CoMP. Referring to FIG. 10, a radio communication system includes a plurality of base stations BS1, BS2 and BS3 for performing the CoMP and a UE. The plurality of base stations BS1, BS2 and BS3 for performing the CoMP may cooperate with each other so as to efficiently transmit data to the UE. The CoMP may be largely divided into two types depending on whether or not data is transmitted from each base station for performing the CoMP:

Joint Processing (CoMP Joint Processing (CoMP-JP))

CoMP-CS/CB (CoMP Cooperative scheduling (CoMP-CS)

In the CoMP-JP, data transmitted to one UE is simultaneously transmitted from the base stations, which perform the CoMP, to the UE and the UE couples the signals from the base stations so as to improve reception performance. That is, the CoMP-JP may use data at each point (eNB) of CoMP cooperation unit. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

On the other hand, in the case of CoMP-CS, data to one UE is transmitted through one eNB at an arbitrary time point, and scheduling or beamforming is performed so as to minimize interference from another eNB. That is, according to the CoMP-CS/CB scheme, CoMP cooperation units may cooperatively perform beamforming of data transmission on a single UE. Here, although data is transmitted at a serving cell, user scheduling/beamforming may be determined according to adjustment of the corresponding CoMP cooperation unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Hereinafter, interference between a plurality of cells will be described.

When two BSs (e.g., BS #1 and BS #2) are adjacently arranged and coverages of the two BSs partially overlap each other, a UE served from one BS may be interfered by a strong downlink signal from another BS. When the interference between cells occurs, the interference between cells can be reduced between the two BSs via a cooperative signal method between cells. Hereinafter, according to the following various embodiments of the present invention, it is assumed that signals are smoothly transmitted and received between two BSs that interfere with each other. For example, it is assumed that a wired/wireless link (e.g., backhaul link or Un interface) with good transmission conditions such as a transmission bandwidth, time delay, or the like is present between the two BSs and reliability with respect to cooperative signals between BSs is high. In addition, it may be assumed that time synchronizations between two BSs match each other within an allowable limits of error (e.g. when boundaries of downlink subframes of the two BSs which interfere with each other or are interfered with each other are aligned), and offset between subframe boundaries between the two BSs is obviously recognized.

Referring back to FIG. 10, BS #1 may be a macro BS that serves a wide region with high transmission power, and BS #2 may be a micro BS (e.g. a pico BS) that serves a narrow region with low transmission power. As illustrated in FIG. 8, a UE located at a cell boundary area of BS #2 and served from BS #2 is strongly interfered from the BS #1, effective communication may be difficult without appropriate cooperation between cells.

In particular, when a large number of UEs is connected to BS #2 as a micro BS with low power so as to distribute load for providing a service by BS #1 as a macro BS, the possibility that a situation corresponding to the interference between cells occurs is high. For example, in order to determine a serving BS, a UE may calculate and compare reception power of downlink signals from the micro BS and the micro BS via a method in which a predetermined bias value is added to reception power from the micro BS and a bias value is not added to reception power from the macro BS. As a result, the UE may determine a BS that providing highest downlink reception power as a serving BS. Thus more UEs may be connected to the micro BS. Although the intensity of a downlink signal that is actually received by the UE is much stronger than a signal from the macro BS, the micro BS may be determined as a serving BS, and a UE connected to the micro BS may experience strong interference from the macro BS. In this case, when cooperation between cells is not provided, UEs located at a boundary of the micro BS may have difficulty in performing an appropriate operation due to strong interference from the macro BS.

Even if interference between cells is present, appropriate cooperation needs to be performed between two BSs for the effective operation, and signals that allow the cooperation operation may be transmitted and received through a link between the two BSs. In this case, when interference between cells occurs between the macro cell and the micro cell, the macro BS may control a cooperation operation between the cells, and the micro BS may perform an appropriate operation according to a cooperation signal indicated by the macro BS.

The above situation corresponding to the interference between cells is merely exemplary, and it would be obvious that embodiments of the present invention can also be applied in the same way when interference between cells occurs in different situations (e.g. when interference between cells occurs between a CSG type HeNB and an OSG type macro BS, when the micro BS causes interference and the macro BS is interfered, or interference between cells occurs between micro BSs or between macro BSs).

Figure 11:
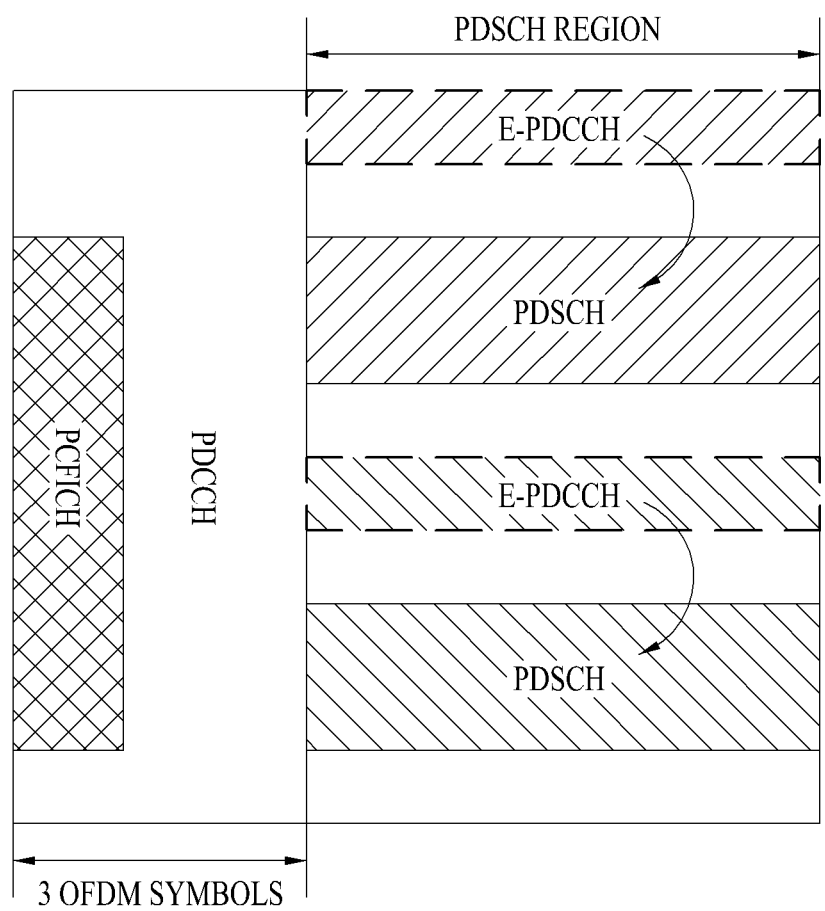
FIG. 11 is a diagram illustrating a PDSCH scheduled by an EPDCCH and an EPDCCH.

FIG. 11 is a diagram illustrating a PDSCH scheduled by an EPDCCH and an EPDCCH.

Referring to FIG. 11, in general, the EPDCCH may be used by defining a portion of a PDSCH region for transmission of data, and a UE needs to perform a blind decoding process for detection of the EPDCCH of the UE. The EPDCCH performs the same scheduling operation (e.g. PDSCH and PUSCH control) as the legacy PDCCH, but as the number of UEs that access a node such as RRH increases, more EPDCCHs may be present in the PDSCH region. In this case, it may be disadvantageous that a number of times of blind decoding to be performed by the UE increase, thereby increasing complexity.

Hereinafter, the present invention proposes a method for effectively achieving an interference randomization effective between different cells with respect to a resource region used for transmission of control information (e.g. EPDCCH) based on the above description. Here, a configuration unit of the EPDCCH may be defined as a REG or a CCE (or an enhanced REG (EREG) or an enhanced CCE (ECCE)). In addition, according to an embodiment of the present invention, a specific EPDCCH may include a set of a plurality of REGs or CCEs (or EREGs or ECCEs). Here, the number of the REGs or CCEs (or EREGs or ECCEs) included in the EPDCCH may be pre-defined.

Hereinafter, for convenience of description, the proposed method will be described in terms of a 3GPP LTE system. However, a scope of the system to which the proposed method is applied can be extended to another system in addition to the 3GPP LTE system.

In addition, the embodiments of the present invention can be extended to any case in which a plurality of REGs or CCEs (or EREGs or ECCEs) included in a specific EPDCCH is configured in the localized or distributed form from at least one pre-defined resource region (e.g. a PRB pair).

In addition, the term REG or EREG used in the present invention is defined as an RE group including a pre-defined REs, but is not limited thereto. That is, various types of REGs or EREGs may be defined. For example, a new concept of an RE group determined to achieve an interference randomization effect between cells, not a concept of an REG included in a specific CCE, or a new concept of an RE group determined to achieve an interference randomization effect between cells, not a concept of an EREG included in a specific ECCE may be defined.

The embodiments of the present invention can be extensively applied to any environment in which communication points are differentiated based on a physical cell ID or a pre-configured virtual cell ID.

According to the present invention, for interference randomization effect between different cells, EREG indexes included in a specific ECCE index may be differently allocated according to change in a PRB pair index for each cell. For example, allocation of the EREG index may be performed in association with a physical cell ID or virtual cell ID of a specific cell. In addition, allocation of the EREG index may be configured to be associated with a random seed configuration value (e.g. $C_{init}$) for generation of a sequence of a specific reference signal (e.g. a DM-RS) used for transmission of an EPDCCH, to be associated with an output value of a pre-defined function having a physical cell ID or virtual cell ID of a specific cell or a random seed configuration value for generation of a sequence of a specific reference signal as an input parameter, or to be associated with a pre-determined specific parameter (e.g. a scrambling ID of a DM-RS or an antenna port of a DM-RS).

According to an embodiment of the present invention, a unit including a plurality of PRB pairs may be pre-defined, or EREG indexes included in a specific ECCE index may be differently configured based on a unit that is newly defined for interference randomization effect.

In addition, according to an embodiment of the present invention, specifically, EREG indexes included in a specific ECCE index are changed according to change in a PRB pair index, but positions of REs included in a specific EREG index are the same in one PRB pair resource region or a resource region including a plurality of pre-defined PRB pairs.

Figure 12:
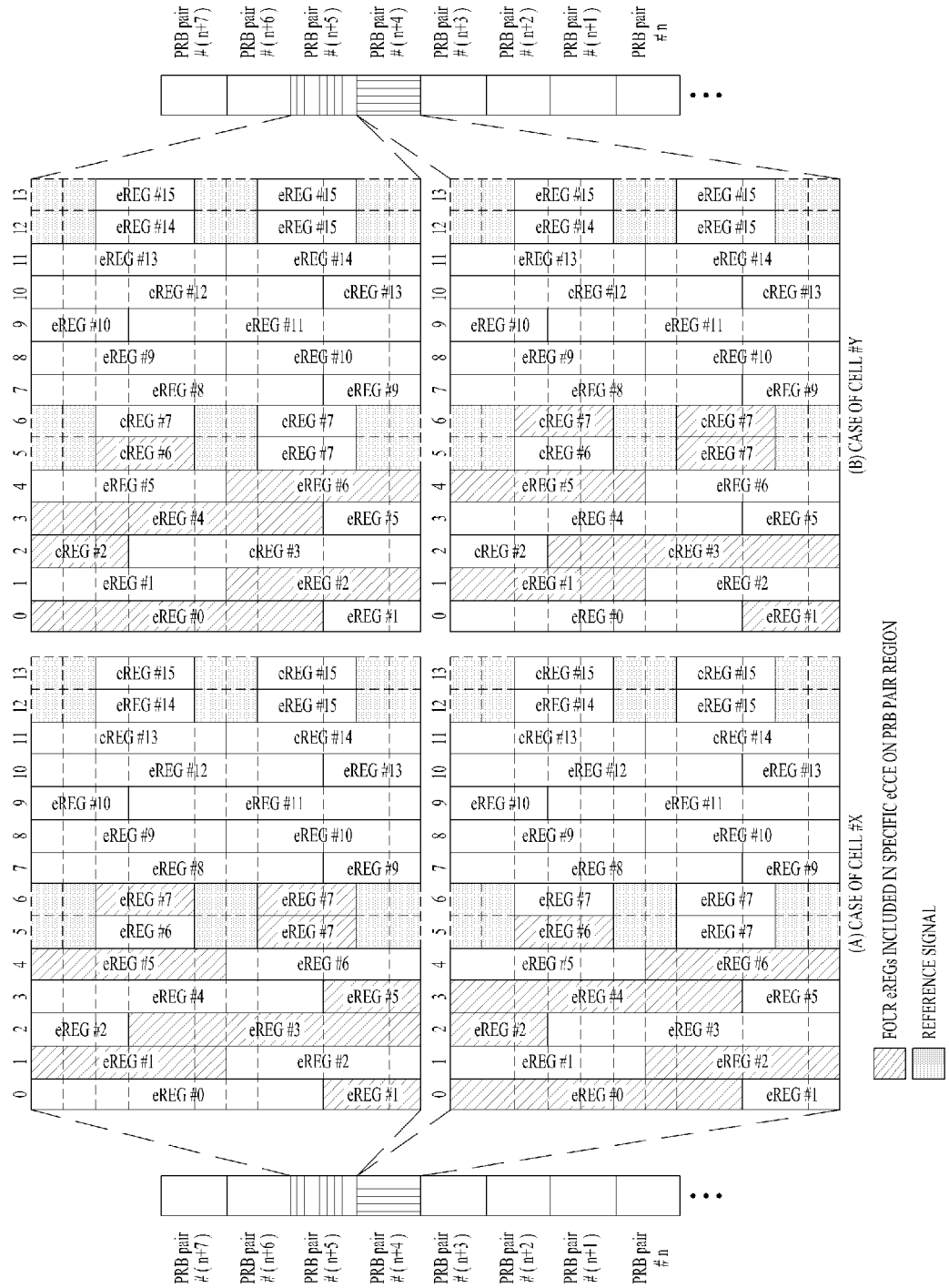
FIG. 12 is a diagram illustrating the case in which EREG indexes included in a specific ECCE indexes are differently allocated according to change in PRB pair index for each cell.

FIG. 12 is a diagram illustrating the case in which EREG indexes included in a specific ECCE indexes are differently allocated according to change in PRB pair index for each cell.

In FIG. 12, it is assumed that a physical cell ID or a virtual cell ID is present in two different cells (cell #X and cell #Y) in a network, a specific ECCE includes four EREGs, and one EREG includes nine RE(s). In FIG. 12, it is assumed that a rule for differently allocating EREG indexes included in a specific ECCE index according to change in PRB pair index for each cell is associated with a physical cell ID or virtual cell ID of a specific cell. In addition, reference signal overhead is assumed as 24 RE(s) (e.g. DM-RS of 8 antenna ports) and the corresponding RE(s) are not assumed to be used for transmission of EPDCCH.

In FIG. 12, when a UE is configured with PRB pair #(n+4) as a control information transmission resource region (e.g. a search space) for communication with cell #X, a specific ECCE includes EREG #0, EREG #2, EREG #4, and EREG #6 in the corresponding region, and a specific ECCE includes EREG #1, EREG #3, EREG #5, and EREG #7 when the UE is allocated the same PRB pair #(n+4) resource region as a control information transmission resource region for communication with cell #Y. In addition, as seen from FIG. 12, when a UE that communicates with cell #X is configured with PRB pair #(n+5) as a control information transmission resource region, a specific ECCE includes EREG #1, EREG #3, EREG #5, and EREG #7 in the corresponding region, and when a UE that communicates with cell #Y is allocated the same PRB pair #(n+5) resource region as a control information transmission resource region, a specific ECCE includes EREG #0, EREG #2, EREG #4, and EREG #6.

That is, according to the present invention, UEs of different cells allocated the same resource region as a control information transmission resource region may be configured in such a way that an EREG index included in a specific ECCE is changed according to change in a PRB pair index on the allocated control information transmission resource region, thereby achieving interference randomization effect with respect to a control information transmission resource region transmitted from different cells at the same time point.

In addition, according to the present invention, the UEs may be configured in such a way that positions of REs included in a specific EREG index may be changed according to change in a PRB pair index for each cell for achieving interference randomization effect between different cells, or positions of REs included in a specific EREG index may be changed according to change in an index of a unit including a plurality of PRB pairs. For example, when EREG indexing for RE(s) at a specific position in PRB pair #n (on time-frequency resources) is determined as k, EREG indexing for RE(s) at the same position in PRB pair #(n+m) may be changed according to a total number of EREGs present on a pre-defined unit region. That is, the EREG indexing may be changed through (k+m) modulo N (here, N is a total number of EREGs present in a pre-defined unit region) calculation, etc.

In addition, configuration for changing positions of REs included in a specific EREG index according to change in PRB pair index for each cell or change in index of a unit including a plurality of PRB pairs may be determined to be associated with a physical cell ID (or a virtual cell ID) of a specific cell.

According to an embodiment of the present invention, EREG permutation or interleaving in a PRB pair unit for each cell may be performed for achieving interference randomization effect between different cells. For example, EREG permutation or interleaving in a PRB pair unit for each cell may be configured as permutation or interleaving associated with a physical cell ID or virtual cell ID of a specific cell. In addition, EREG permutation (or interleaving) in a PRB pair unit for each cell may be configured to be associated with a random seed configuration value (e.g. $C_{init}$) for generation of a sequence of a specific reference signal (e.g. DM-RS) used for EPDCCH transmission/reception, to be associated with an output value of a pre-defined function having a physical cell ID or virtual cell ID of a specific cell or a random seed configuration value for generation of a sequence of a specific reference signal as an input parameter, or to be associated with a pre-determined specific parameter (e.g. a scrambling ID of a DM-RS or an antenna port of a DM-RS). In addition, according to an embodiment of the present invention, a unit configured as a plurality of PRB pairs may be pre-defined and then an EREG permutation (or interleaving) operation may be configured based on the corresponding unit.

In addition, according to embodiments of the present invention, when the EREG permutation or interleaving operation is performed based on a PRB pair unit or a pre-defined unit, block interleaver or permutation applied to each unit region may be configured to be the same or different. Here, in the latter case, the block interleaver (or permutation) associated with a PRB pair unit index or an index of a pre-defined unit may be configured.

Figure 13:
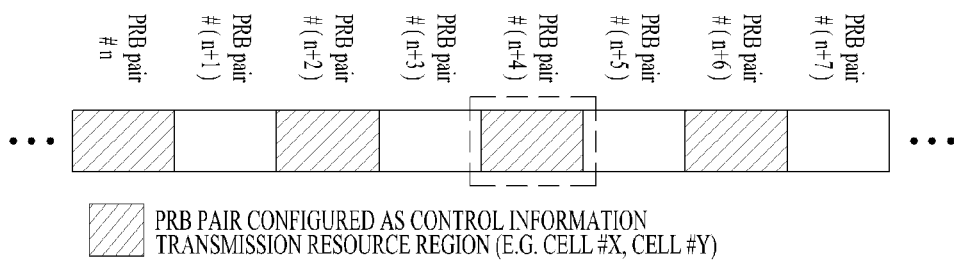
FIGS. 13 and 14 are diagrams illustrating cases in which an EREG permutation (or interleaving) operation is performed in a PRB pair unit for each cell according to an embodiment of the present invention.

FIGS. 13 and 14 are diagrams illustrating cases in which an EREG permutation (or interleaving) operation is performed in a PRB pair unit for each cell according to an embodiment of the present invention. Here, it may be assumed that a physical cell ID or a virtual cell ID is present in two different cells (cell #X and cell #Y) in a network, a specific ECCE includes four EREGs, and one EREG includes nine RE(s). In addition, it is assumed that an EREG permutation (or interleaving) operation in a PRB pair unit for each cell is associated with a physical cell ID or virtual cell ID of a specific cell. In addition, it is assumed that reference signal overhead as 24 RE(s) (e.g. DM-RS of eight antenna ports) and the corresponding RE(s) is not used for EPDCCH transmission.

Hereinafter, for convenience of description, a result (e.g. EREG) obtained from the block interleaver (or permutation) may be allocated onto a specific PRB pair via a frequency prioritized mapping method, but the embodiments of the present invention can be extensively applied to any case in which the result obtained from the block interleaver (or permutation) is allocated via a time prioritized mapping method or a new pre-defined mapping method. In addition, it is assumed that a plurality of ECCEs (or EREGs) included in a specific EPDCCH is configured as distributed ECCEs (or EREGs) including a plurality of PRB pairs (e.g. PRB pair #n, PRB pair #(n+2), PRB pair #(n+4), and PRB pair #(n+6)) configured as a control information transmission resource region.

FIG. 13 illustrates the case in which an EREG permutation (or interleaving) operation in a PRB pair unit for each cell is performed and a control information transmission resource region (e.g. a search space) is configured as PRB pair #(n+4).

In this case, as illustrated in FIG. 14, EREG permutation (or interleaving) configuration assumed in PRB pair #(n+4) configured as a control information transmission resource region (e.g. a search space) by a UE that communicates with cell #X may be different from EREG permutation (or interleaving) configuration in the corresponding region assumed by (the same or different) UEs that communicate with cell #Y allocated the same PRB pair #(n+4) resource as a control information transmission resource region.

In detail, cell #X and cell #Y may commonly use block interleaver (or permutation) with four lows and four columns, but an order of column interleaving (or column permutation) may be differently configured as "1, 3, 0, 2" in the case of cell #X and "0, 2, 1, 3" in the case of cell #Y. Here, the order of the column interleaving (or column permutation) may be configured to be changed in associated with a physical cell ID or virtual cell ID of each cell.

In addition, according to an embodiment of the present invention, a column sixe of block interleaver may be configured as the number of EREGs included in a specific ECCE, an integer that is relatively prime to the number of EREGs included in a specific ECCE, or an integer that is relatively prime to a total number (i.e. N) of EREGs present in a pre-defined unit region. In this case, a row size of block interleaver may be variably configured according to the number of ECCEs to be permutated or interleaved or the number of ECCEs to be derived from one PRB pair (or a pre-defined PRB group).

FIG. 14 illustrates the case in which results (e.g. EREG) of block interleaver (or permutation) are configured to be sequentially derived in ascending order of a column index of the corresponding block interleaver (or permutation). This configuration can also be extensively applied to the case in which various block interleavers for EREG permutation or interleaving of a PRB pair unit (or a pre-defined unit) are embodied. In addition, the configuration can also be extensively applied to the case in which results of block interleaver are sequentially derived in ascending order of a column (or row) index of the corresponding block interleaver, and the case in which results of permutation are sequentially derived in ascending (descending) order of a column (or row) index of permutation of the corresponding block.

Figure 14B:
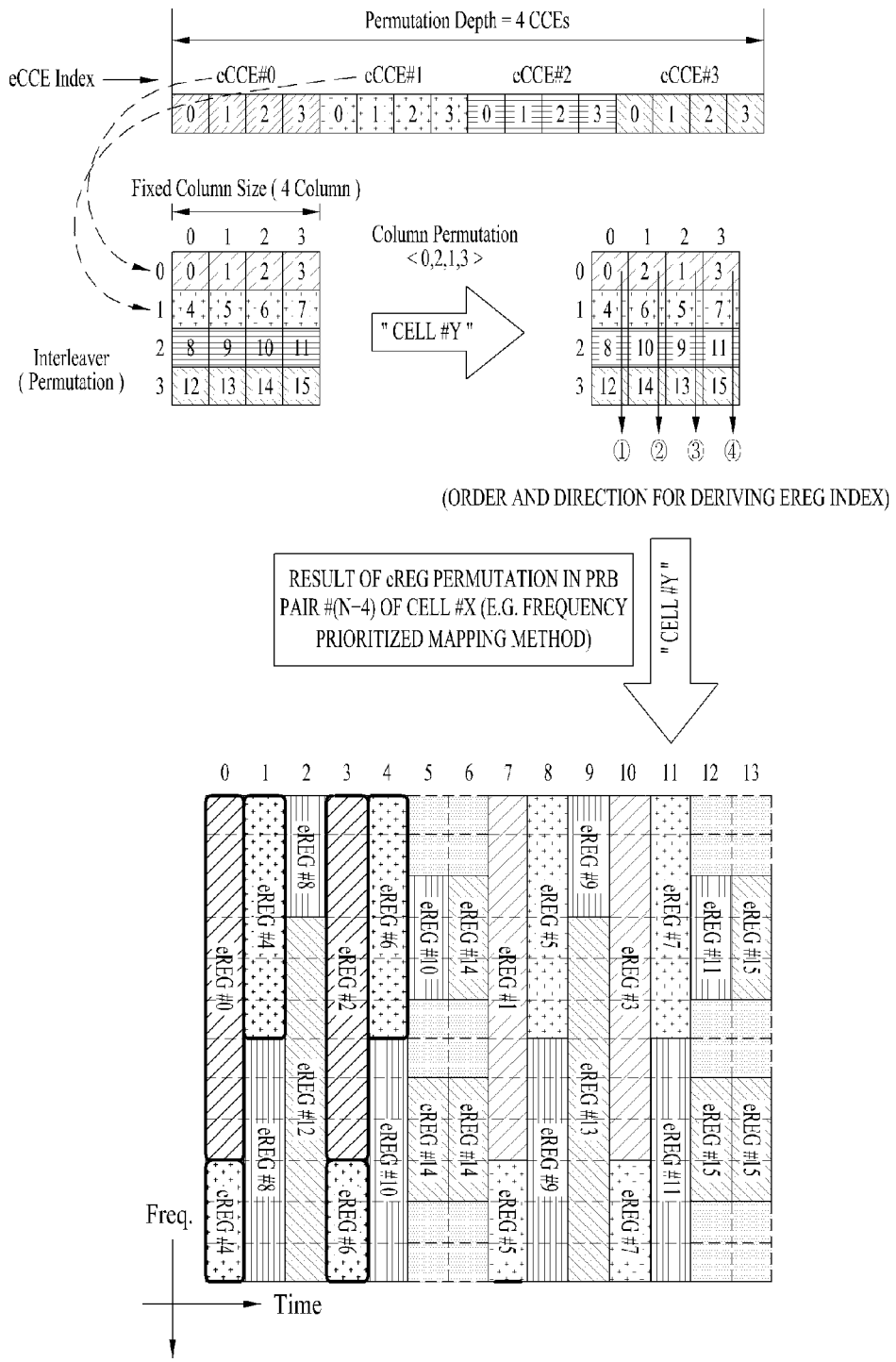

Thus, as seen from FIGS. 14(a) and 14(b), when a specific UE is configured with a specific ECCE as EREG #0, EREG #2, EREG #4, and EREG #6 in a PRB pair #(n+4) configured as a control information transmission resource region, positions of four EREGs included in the corresponding ECCE in cell #X are different from positions of four EREGs included in the corresponding ECCE in cell #Y.

That is, according to the above embodiment of the present invention, different cells may perform an EREG permutation or interleaving operation in a PRB pair unit based on a pre-defined rule, and thus interference randomization effect can also be achieved with respect to a control information transmission resource region transmitted at the same time point between cells.

FIG. 15 is a diagram illustrating the case in which block interleaver or permutation is performed in the same situation as in FIG. 14, according to another embodiment of the present invention. In FIG. 15, a total number of EREGs present in a pre-defined unit region is defined as N (N is an integer).

In FIG. 15, a column size of block interleaver is assumed to be an integer (or an integer that is relatively prime to a total number of EREGs present in a pre-defined unit region) that is relatively prime to the number of EREGs included in a specific ECCE, and a row size of the block interleaver is assumed to be a rounded-up value obtained via calculation of "a total number (i.e. N) of EREGs present in a pre-defined unit region/a column size of block interleaver".

Accordingly, in FIG. 15, since a specific ECCE includes four EREGs, the column size of the blocking interleaver is configured as 5 that is relatively prime to the corresponding value, and since 16 of total EREGs are present in one PRB pair region, the row size of the block interleaver is configured as 4 (i.e. 16/5], and here, '[A]' refers to a rounded-up value of A). In addition, the block interleaver (or permutation) is configured to sequentially derive results of the blocking interleaver (or permutation) in ascending order of the column index of the corresponding block interleaver (or permutation). When this operation is performed, a rule for omitting deriving of a corresponding value and performing deriving of a next result is assumed when a null value or a value that does not correspond to all EREG indexes present in a pre-defined unit region is present in a block interleaver (or permutation) matrix.

In FIG. 15, cell #X and cell #Y may commonly use block interleaver (or permutation) with four lows and five columns, but an order of column interleaving (or column permutation) may be differently configured as "1, 3, 0, 4, 2" in the case of cell #X and "4, 2, 1, 3, 0" in the case of cell #Y. Here, for example, the order of the column interleaving (or column permutation) may be configured to be changed in associated with a physical cell ID (or virtual cell ID) of each cell. Accordingly, in FIGS. 15(a) and 15(b), when a specific UE is configured with a specific ECCE as EREG #0, EREG #2, EREG #4, and EREG #6 in PRB pair #(n+4) configured as a control information transmission resource region, positions of four EREGs included in the corresponding ECCE in cell #X are different from positions of four EREGs included in the corresponding ECCE in cell #Y.

FIG. 16 is a diagram illustrating the case in which block interleaver (or permutation) is performed in the same situation as in FIG. 14, according to another embodiment of the present invention.

In FIG. 16, it is assumed that EREG indexes are derived according to a pre-defined configuration in a diagonal direction of block interleaver (or permutation) from the corresponding block interleaver (or permutation). Here, configuration of deriving the EREG indexes in the diagonal direction of the block interleaver (or permutation) may be associated with a physical cell ID or virtual cell ID of a specific cell. In addition, the configuration for the EREG indexes illustrated in FIG. 15 can be extensively applied to the case (e.g. FIGS. 14 and 15) in which various block interleavers for EREG permutation (or interleaving) of a PRB pair unit (or a pre-defined unit) are embodied.

Figure 16B:
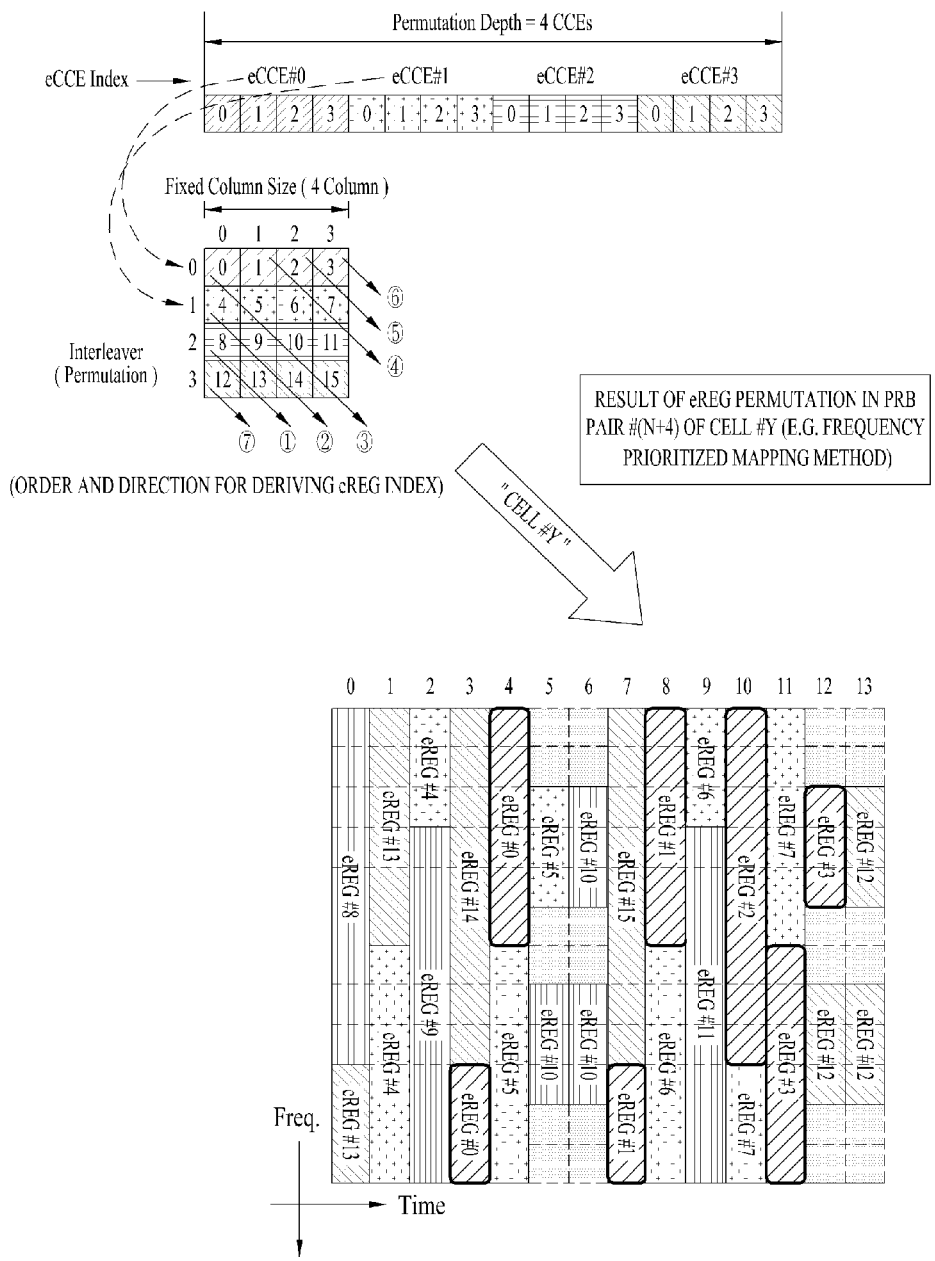

Thus, as illustrated in FIGS. 16(a) and 16(b), when a specific UE is configured with a specific ECCE as EREG #0, EREG #1, EREG #2, and EREG #3 in PRB pair #(n+4) configured as a control information transmission resource region, positions of four EREGs included in the corresponding ECCE in cell #X may be different from positions of four EREGs included in the corresponding ECCE in cell #Y.

Hereinafter, another embodiment of the present invention proposes a method for effectively performing an interleaving (or permutation) operation on an EREG index applied to a corresponding unit when an EREG permutation (or interleaving) operation is performed based on a PRB pair unit for each cell or a pre-defined unit in order to maximize interference randomization effect between cells.

Hereinafter, for convenience of description, it is assumed that an EREG index is derived based on a plurality of pre-defined parameters from block interleaver (or permutation). However, according to an embodiment of the present invention, an EREG index may be derived based on a plurality of pre-defined parameters from N of total EREG indexes present in a pre-defined unit region without embodying block interleaver (or permutation).

In addition, the proposed method can also be extensively applied to the case in which various block interleavers for EREG permutation or interleaving of a PRB pair unit or a pre-defined unit are embodied (e.g. in FIGS. 14, 15, and 16).

FIG. 17 is a diagram illustrating the case in which EREG index interleaving (or permutation) is performed on a pre-defined unit region for each cell in the same situation as in FIG. 14, according to another embodiment of the present invention.

In FIG. 17, it is assumed that EREG indexes are derived based on a plurality of pre-defined parameters from block interleaver (or permutation).

For example, a pre-defined parameter may be defined as k that refers to a first EREG index or an initial EREG index derived from block interleaver (or permutation), and L that refers to increasing offset for EREG indexes derived after the initial (or first) EREG index. Here, L may be configured as an integer that is relatively prime to a row size and/or column size of block interleaver (or permutation), configured as an integer that is relatively prime to the number of EREGs included in a specific ECCE, or an integer that is relatively prime to a total number (i.e. N) of EREGs present in a pre-defined unit region. That is, when the total number of EREGs present in the pre-defined unit region is N, an order of EREG indexes derived from block interleaver (or permutation) according to the aforementioned embodiment of the present invention may correspond to "k→((k+L) modulo N)→((k+2*L) modulo N)→((k+3*L) modulo N)→ . . . →((k+(N−2)*L) modulo N)→((k+(N−1)*L) modulo N)" (here, 'A modulo B' refers to calculation for outputting a remainder obtained by dividing A by B and $k_1$→$k_2$ refers to sequential deriving in an order of k1 to k2).

As another example, k that refers to a first EREG index or an initial EREG index derived from block interleaver (or permutation) may be associated with a physical cell ID or virtual cell ID of a specific cell or an increasing offset value (i.e. L) for EREG indexes derived from block interleaver (or permutation) may be associated with the physical cell ID or virtual cell ID of the specific cell. That is, k may be configured according to "(a physical cell ID of a specific cell) modulo (a total number of EREGs present in a pre-defined unit region)" or "(a virtual cell ID of a specific cell) modulo (a total number of EREGs present in a pre-defined unit region)".

In FIG. 17, L_X and k_X of cell #X are assumed to be 5 and 0, respectively, and L_Y and k_Y of cell #Y are assumed to be 5 and 5, respectively. Here, a total number of EREGs present in a PRB pair as a pre-defined unit region in cell #X and cell #Y is assumed to be 16.

As illustrated in FIGS. 17(a) and 17(b), when a specific UE is configured with a specific ECCE as EREG #0, EREG #1, EREG #2, and EREG #3 in PRB pair #(n+4) configured as a control information transmission resource region, positions of four EREGs included in the corresponding ECCE in cell #X may be different from positions of four EREGs included in the corresponding ECCE in cell #Y.

According to the aforementioned embodiment of the present invention, a specific cell may notify a UE of information about a total number (i.e. N) of EREGs present in a pre-defined unit region, the number of EREGs included in a specific ECCE, or an increasing offset value (i.e. L) information for EREG indexes derived from block interleaver (or permutation) via a higher layer signal or a physical layer signal. In addition, the specific cell may notify the UE of information about k that refers to a first EREG index or an initial EREG index derived from block interleaver (or permutation).

In addition, according to the present invention, information about parameters configured to achieve the aforementioned interference randomization effect between cells may be configured to be shared between different cells through a pre-defined radio channel or an X2 interface. Accordingly, a more efficient interference randomization operation can be performed based on a cooperation operation between cells.

According to another embodiment of the present invention, an EREG index may be configured to be derived based on one pre-defined parameter from block interleaver (or permutation).

For example, the parameter may be defined as an increasing offset value (i.e. L) for EREG indexes derived from block interleaver (or permutation).

As another example, a table (e.g. a lookup table) including candidates with the form of "an initial EREG index and an increasing offset value for EREG indexes" (or "an initial EREG index or a first EREG index and an increasing offset value for EREG indexes") for maximizing interference randomization effect between cells in an environment, in which a total number of EREGs present in a pre-defined unit region is N, may be pre-defined, and then an EREG permutation (or interleaving) operation based on a PRB pair unit or a pre-defined unit may be performed based on the corresponding table. In this case, from a viewpoint of a specific cell, selection of candidates of "an initial EREG index and an increasing offset value for EREG indexes" on (for example,) the table may be configured based on a physical cell ID or virtual cell ID of the specific cell. Alternatively, the specific cell may be configured using a value obtained via calculation of "(a physical cell ID) modulo (a total number of EREGs present in a pre-defined unit region)" or "(a virtual cell ID) modulo (a total number of EREGs present in a pre-defined unit region)". That is, the value obtained through the aforementioned calculation may be compared with the initial EREG index (or the first EREG index) stated in the table, and then a matched candidate or an arbitrary one of matched candidates on the table may be selected.

In addition, according to another embodiment of the present invention, when an EREG permutation (or interleaving) operation based on a PRB pair unit or a pre-defined unit is performed for achieving interference randomization effect between cells, the interleaving (or permutation) operation for an EREG index applied to the corresponding unit can be efficiently performed, which will be described below.

According to an embodiment of the present invention, an EREG index interleaving (or permutation) operation based on a pre-defined unit may be performed based on another method that is not block interleaver (or permutation).

According to an embodiment of the present invention, when a total number of EREGs present in a pre-defined unit region is N, a virtual matrix with one row and N columns. However, according to the following embodiment of the present invention, a virtual matrix may be operated as a type of block interleaver (or permutation) according to an operating method. That is, the interleaving operation of an EREG index for a unit region may be performed based on a plurality of pre-defined parameters and the virtual matrix with one row and N columns. In this case, the pre-defined parameters may be defined as j that refers to a position in which a first EREG index on a virtual matrix is inserted (mapped) and P that refers to increasing offset for positions in which EREG indexes after a first EREG index is inserted (mapped). In this case, P may be configured as an integer that is relatively prime to the number of EREGs included in a specific ECCE or configured as an integer that is relatively prime to a total number (i.e. N) of EREGs present in a pre-defined unit region. Here, an EREG index inserted into the virtual matrix increases sequentially, but positions in which each EREG is inserted on a virtual matrix is determined based on a pre-defined increasing offset value (i.e. P).

For example, according to the aforementioned embodiment of the present invention, when a total number of EREGs present in a pre-defined unit region is N, a position in which "EREG #0, EREG #1, . . . , EREG #(N−2), EREG #(N−1)" is inserted on a (virtual) matrix with one row and N columns may be configured as "j, ((j+P) modulo N), ((j+2*P) modulo N), ((j+3*P) modulo N), . . . , ((j+(N−2)*P) modulo N), ((j+(N−1)*P) modulo N)".

As another example, j that refers to a position in which a first EREG index is inserted (or mapped) may be associated with a physical cell ID or virtual cell ID of a specific cell. That is, for example, j may be calculated according to "(a physical cell ID of a specific cell) modulo (a total number of EREGs present in a pre-defined unit region)", "(a physical cell ID of a specific cell) modulo (an increasing offset value (i.e. P) of positions in which EREG indexes are inserted)", "(a virtual cell ID of a specific cell) modulo (a total number of EREGs present in a pre-defined unit region)", or "(a virtual cell ID of a specific cell) modulo (an increasing offset value (i.e. P) of positions in which EREG indexes are inserted)". In addition, P indicating increasing offset for positions in which EREG indexes are inserted may also be associated with a physical cell ID or virtual cell ID of a specific cell.

Figure 18A:
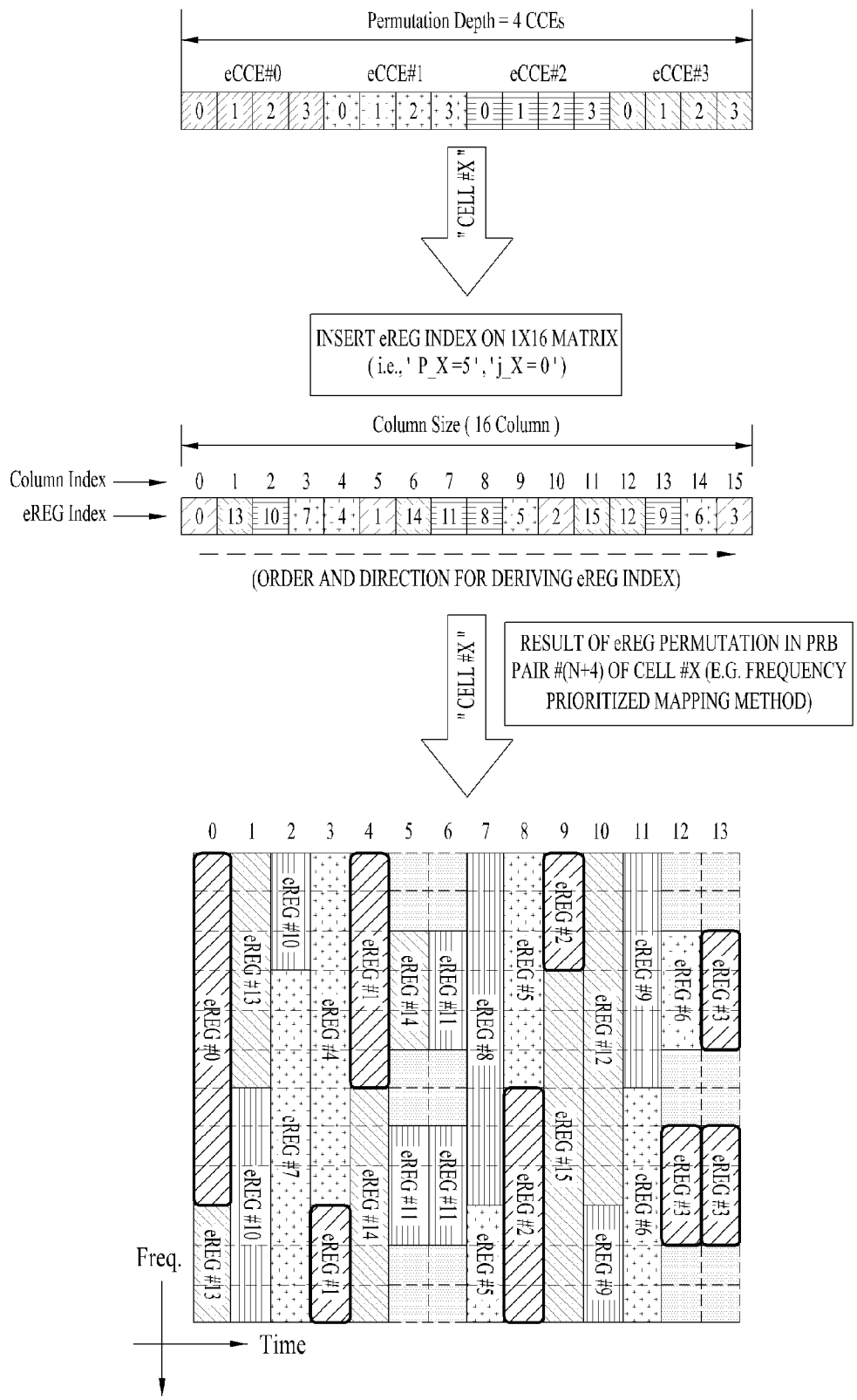
Figure 18B:
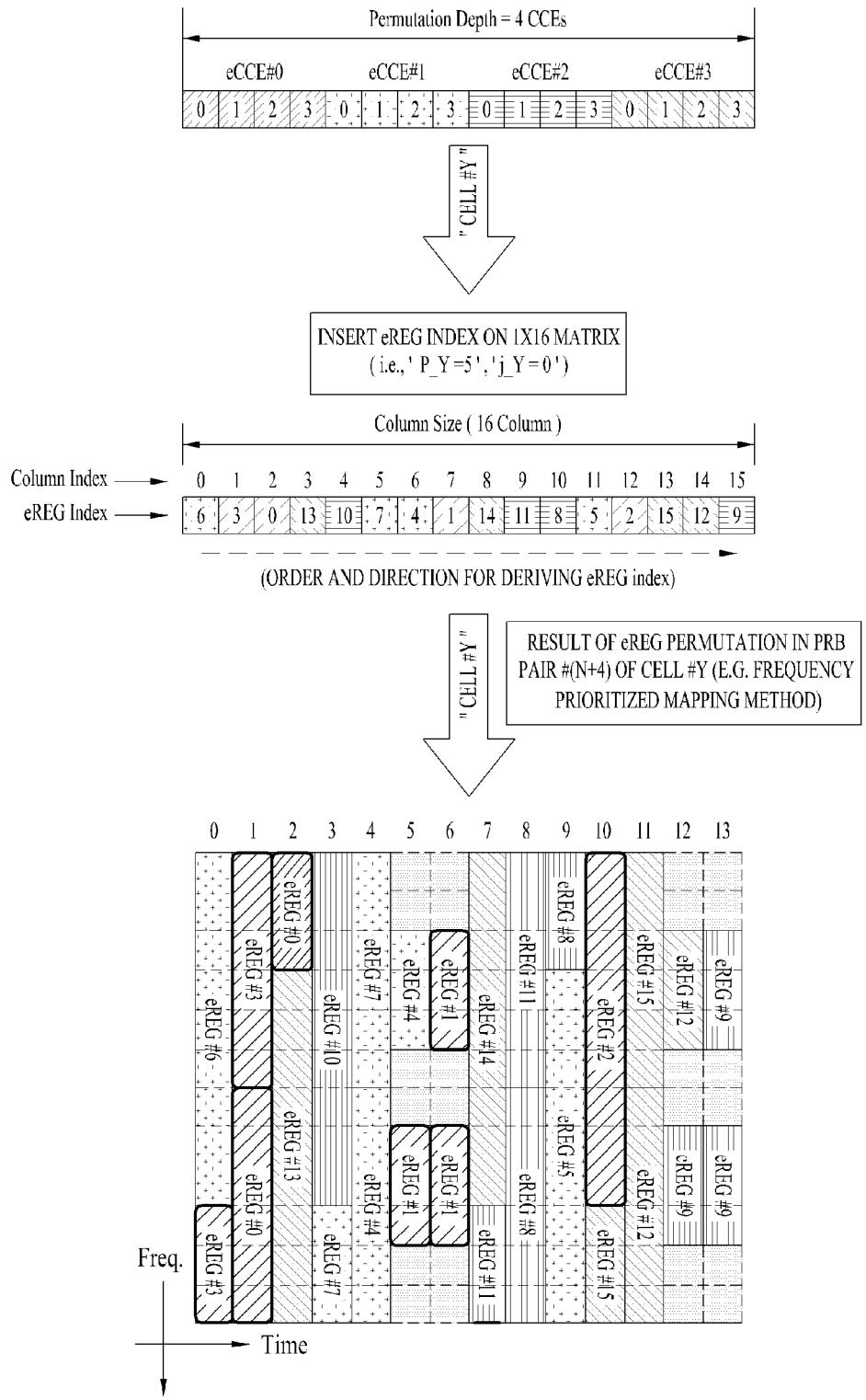

FIG. 18 is a diagram illustrating the case in which an EREG index interleaving (or permutation) operation for a pre-defined unit region is performed in the same situation as in FIG. 14, according to another embodiment of the present invention. Here, P_X and j_X of cell #X are assumed to be 5 and 0, respectively, and P_Y and j_Y of cell #Y are assumed to be 5 and 2, respectively. In addition, a total number of EREGs present in a PRB pair as a pre-defined unit region in cell #X and cell #Y is assumed to be 16.

Although FIG. 18 assumes a rule for sequentially deriving EREG indexes inserted (or mapped) on a virtual matrix in ascending order of a column index as an example, the aforementioned embodiment can also be extensively applied to the case in which EREG indexes inserted (or mapped) on a virtual matrix are sequentially derived in descending order of a column index of the corresponding matrix.

In addition, as illustrated in FIG. 18, when a specific UE is configured with a specific ECCE as EREG #0, EREG #1, EREG #2, and EREG #3 in PRB pair #(n+4) configured as a control information transmission resource region, positions of four EREGs included in the corresponding ECCE in cell #X may be different from positions of four EREGs included in the corresponding ECCE in cell #Y.

In addition, a specific ell may notify a UE of at least one of information of a total number (i.e. N) of EREGs present in a pre-defined unit region, the number of EREGs included in a specific ECCE, j that refers to a position in which a first EREG index is inserted (or mapped) on a virtual matrix, and P that refers to increasing offset for positions in which EREG indexes are inserted, via a higher layer signal or a physical layer signal.

According to another embodiment of the present invention, a table (e.g. a lookup table) including candidates with the form of "a value indicating a position in which a first EREG index is inserted on a virtual matrix and an increasing offset value for positions in which EREG indexes are inserted" for maximizing interference randomization effect between cells in an environment, in which a total number of EREGs present in a pre-defined unit region is N, may be pre-defined, and then and then an EREG permutation (or interleaving) operation based on a PRB pair unit or a pre-defined unit may be performed based on the corresponding table. In this case, from a viewpoint of a specific cell, selection of candidates of "a value indicating a position in which a first EREG index is inserted on a virtual matrix and an increasing offset value for positions in which EREG indexes are inserted" on the table may be configured based on a physical cell ID or virtual cell ID of the specific cell. Alternatively, the specific cell may be configured using a value obtained via specific calculation among calculations of "(a physical cell ID) modulo (a total number of EREGs present in a pre-defined unit region)", "(a physical cell ID) modulo (a total number of EREGs present in a pre-defined unit region)", "(a virtual cell ID) modulo (a total number of EREGs present in a pre-defined unit region)", and "(a virtual cell ID) modulo (an increasing offset value (i.e. P) for positions in which EREG indexes are inserted)". That is, the value obtained through the aforementioned calculation may be compared with the "value indicating a position in which a first EREG index is inserted on a virtual matrix" stated in the table, and then a matched candidate (or an arbitrary one of matched candidates) on the table may be selected.

In addition, cells with different physical cell IDs or virtual cell ID may be configured to share increasing offset (i.e. P) for positions in which the same value of EREG indexes are inserted and a value (i.e. j) for a position in which different values of first EREG indexes are inserted or mapped via signal exchange between cells.

In addition, the operation according to the aforementioned embodiment can be embodied in the same way via pre-defined block interleaver (or permutation) or column interleaving (permutation). For example, a column size of the corresponding block interleaver (or permutation) may be configured as "an increasing offset value (i.e. P) for positions in which EREG indexes are inserted", and a row size may be configured as a rounded-up value of a value obtained via calculation of "a total number (i.e. N) of EREGs present in a pre-defined unit region/a column size of block interleaver".

The aforementioned embodiments of the present invention can also be extensively applied to any cases in which a component carrier or cells based on one or more EPDCCHs are used or an EPDCCH-based component carrier or cell and legacy PDCCH-based component carrier is used together in an environment to which a carrier aggregation (CA) scheme is applied.

The aforementioned embodiments of the present invention can also be extensively applied to a case in which an extension carrier is operated based on an EPDCCH in an environment to which a CA scheme is applied.

According to the aforementioned embodiments of the present invention, when an EREG permutation (or interleaving) operation is performed based on a PRB pair unit or a pre-defined unit, block interleaver (or permutation) may be configured to be the same or different.

The above-described embodiments may be combined with each other, and thus, may be used alone or in combination thereof, if necessary. The combination type of proposed methods can also be interpreted as a type of new proposal.

Thus, an example or embodiment of the present invention can be included as one of methods according to the present invention and thus it would be obvious that the example or embodiment of the present invention can be considered as types of pr posed methods.

Figure 19:
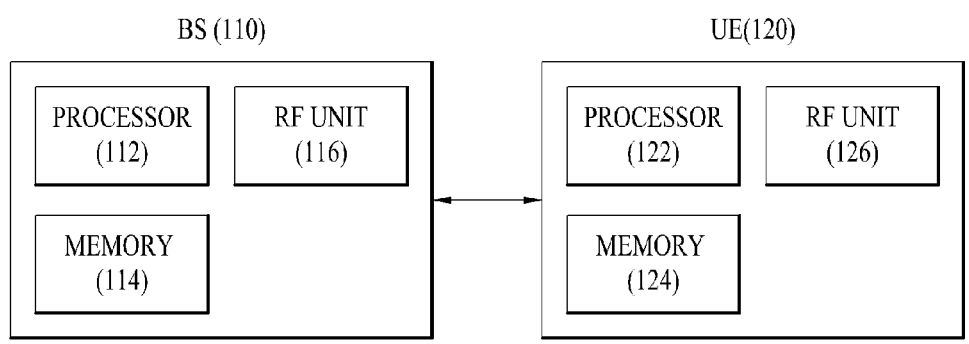
FIG. 19 is a diagram illustrating a base station (BS) and a user equipment (UE) to which an embodiment of the present invention is applicable.

FIG. 19 is a diagram illustrating a BS 110 and a UE 120 to which an embodiment of the present invention is applicable.

When a wireless communication system includes a relay, communication at a backhaul link is performed between the BS 110 and the relay and communication at an access link is performed between the relay and the UE 120. Thus, the BS 110 and the UE 120 illustrated in FIG. 19 can be replaced with a relay as necessary.

Referring to FIG. 19, the wireless communication system includes the BS 110 and the UE 120. The BS 110 includes a processor 112, a memory 114, and a radio frequency (RF) unit 116. The processor 112 may be configured to embody procedures and/or methods proposed according to the present invention. The memory 114 is connected to the processor 112 and stores various information associated with an operation of the processor 112. The RF unit 116 is connected to the processor 112 and transmits and/or receives a radio signal. The UE 120 includes a processor 122, a memory 124, and an RF unit 126. The processor 122 may be configured to embody procedures and/or methods proposed according to the present invention. The memory 124 is connected to the processor 122 and stores various information associated with an operation of the processor 122. The RF unit 126 is connected to the processor 122 and transmits and/or receives a radio signal. The BS 110 and/or the UE 120 may each have a single antenna or a multiple antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

In the above description, the present invention has been described with regard to a $3^{rd}$ generation partnership project (3GPP) long term evolution (LTE) system, but the present invention can be applied to various wireless communication systems in addition to the 3GPP LTE system.

The invention claimed is:

1. A method for receiving control information by a user equipment (UE) in a wireless communication system, the method comprising:
    receiving a specific downlink subframe including a plurality of control information,
    wherein each of the plurality of control information is associated with a different base station (BS);
    monitoring a first control information of the plurality of control information on a first resource region according to a first pattern,
    wherein the first pattern is determined based on a first antenna port of a first demodulation reference signal (DM-RS) associated with a first BS from a pre-defined block interleaver; and
    monitoring a second control information of the plurality of control information on a second resource region according to a second pattern,
    wherein the second pattern is determined based on a second antenna port of a second DM-RS associated with a second BS from the pre-defined block interleaver, and
    wherein the first pattern is arranged so as to not overlap with the second pattern.

2. The method according to claim 1, wherein the pre-defined block interleaver has a column size determined to be relatively prime to a number of resource regions of the specific downlink subframe.

3. The method according to claim 1, wherein each of the first pattern and the second pattern is generated via column permutation of the pre-defined block interleaver.

4. The method according to claim 1, wherein each of the first pattern and the second pattern is generated in such a way that diagonal matrix values of a matrix included in the pre-defined block interleaver are different.

5. The method according to claim 1, wherein each of the first pattern and the second pattern is derived according to at least one pre-defined parameter from the pre-defined block interleaver.

6. The method according to claim 5, wherein the at least one pre-defined parameter is received via higher layer signaling.

7. The method according to claim 5, wherein the at least one pre-defined parameter is configured to be shared between the first BS and the second BS.

8. The method according to claim 5, wherein the at least one pre-defined parameter is selected from a pre-stored table.

9. The method according to claim 1, wherein each of the first pattern and the second pattern is derived according to a plurality of pre-defined parameters, from a virtual matrix.

10. The method according to claim 9, wherein the at least one pre-defined parameter comprises a specific radio resource unit index associated with the virtual index and increasing offset for a radio resource unit index.

\* \* \* \* \*